(12) United States Patent
Seguin et al.

(10) Patent No.: US 11,884,351 B2
(45) Date of Patent: Jan. 30, 2024

(54) SYSTEMS AND METHODS FOR BICYCLES AND OTHER VEHICLES TO CARRY GOLF BAGS

(71) Applicant: FIDUCIE RICHARD SEGUIN, Laval (CA)

(72) Inventors: Richard Seguin, Montreal (CA); Alain Marchand, Mascouche (CA)

(73) Assignee: FIDUCIE RICHARD SEGUIN, Laval (CA)

( * ) Notice: Subject to any disclaimer, the term of this patent is extended or adjusted under 35 U.S.C. 154(b) by 282 days.

(21) Appl. No.: 17/347,242

(22) Filed: Jun. 14, 2021

(65) Prior Publication Data

US 2021/0387688 A1   Dec. 16, 2021

Related U.S. Application Data

(63) Continuation-in-part of application No. 29/762,090, filed on Dec. 15, 2020.

(60) Provisional application No. 63/039,726, filed on Jun. 16, 2020.

(51) Int. Cl.
*B62J 9/23* (2020.01)
*A63B 55/60* (2015.01)
*A63B 55/50* (2015.01)

(52) U.S. Cl.
CPC ................ *B62J 9/23* (2020.02); *A63B 55/50* (2015.10); *A63B 55/60* (2015.10)

(58) Field of Classification Search
CPC ........ B62J 9/23; B62J 7/04; B62J 7/08; A63B 55/50; A63B 55/60; A63B 2055/603; B62H 1/00; B62K 27/12
See application file for complete search history.

(56) References Cited

U.S. PATENT DOCUMENTS

| | | | | | |
|---|---|---|---|---|---|
| 1,030,844 | A | * | 6/1912 | Howell | B62J 7/04 224/415 |
| 3,286,891 | A | * | 11/1966 | Jones, Jr. | B62J 7/04 224/418 |
| 3,827,613 | A | * | 8/1974 | Meyer | B62J 9/00 224/450 |
| 4,371,184 | A | * | 2/1983 | Henden | B60D 1/50 280/495 |
| 4,387,836 | A | * | 6/1983 | Laesch | B62J 7/02 224/457 |

(Continued)

FOREIGN PATENT DOCUMENTS

| | | | | |
|---|---|---|---|---|
| DE | 102013103787 | A1 * | 10/2014 | B62J 7/04 |
| ES | 2617038 | | 12/2017 | |

(Continued)

OTHER PUBLICATIONS

Website fattiregolfscooter.com, screenshot accessed on Dec. 21, 2021, 11 pages.

*Primary Examiner* — John K Fristoe, Jr.
*Assistant Examiner* — Justin Caudill

(57) ABSTRACT

A system for a bicycle or other vehicle to carry a golf bag, such as to, from, and on a golf course, in which the system can facilitate its use and transportation of the golf bag, such as by providing adjustability (e.g., to adjust how the golf bag is positioned), stability (e.g., to properly distribute weight and/or adapt to irregularity, softness, and/or other conditions of a ground surface), and/or other benefits.

30 Claims, 37 Drawing Sheets

(56) References Cited

U.S. PATENT DOCUMENTS

| | | | | |
|---|---|---|---|---|
| 4,410,116 A * | 10/1983 | Mattei | ........................ | B62J 7/04 |
| | | | | 224/452 |
| 5,340,003 A * | 8/1994 | Wilson | ..................... | B62J 11/05 |
| | | | | 224/558 |
| 5,468,006 A * | 11/1995 | Delserro | .................. | B62J 11/04 |
| | | | | 280/DIG. 6 |
| 5,482,304 A | 1/1996 | Smith | | |
| 5,542,587 A * | 8/1996 | Broz | ........................ | B62J 1/16 |
| | | | | 224/430 |
| 7,273,221 B2 * | 9/2007 | Ockenden | .............. | B62K 19/40 |
| | | | | 280/288.4 |
| 9,174,699 B2 * | 11/2015 | Lee | ........................ | B62K 27/12 |
| 9,187,142 B2 * | 11/2015 | McKenzie | ................. | B62J 7/04 |
| 9,616,955 B2 | 4/2017 | May | | |
| 10,351,196 B2 * | 7/2019 | Bain | ....................... | B62J 11/00 |
| 2004/0145136 A1 * | 7/2004 | Yang | ....................... | B62B 1/042 |
| | | | | 280/47.24 |
| 2008/0035691 A1 * | 2/2008 | Losos | ........................ | B62J 9/24 |
| | | | | 224/429 |
| 2008/0169323 A1 * | 7/2008 | Deitrich | ................. | B62K 11/00 |
| | | | | 224/413 |
| 2009/0014486 A1 * | 1/2009 | Humphreys | ............... | B62J 7/04 |
| | | | | 224/430 |
| 2011/0057007 A1 * | 3/2011 | Conroy, Jr. | ................. | B62J 7/04 |
| | | | | 224/433 |
| 2014/0224852 A1 * | 8/2014 | Ponder | ....................... | B62J 7/00 |
| | | | | 224/447 |

FOREIGN PATENT DOCUMENTS

| | | |
|---|---|---|
| JP | 2017200799 | 11/2017 |
| WO | WO-2017103311 A1 * | 6/2017 |

* cited by examiner

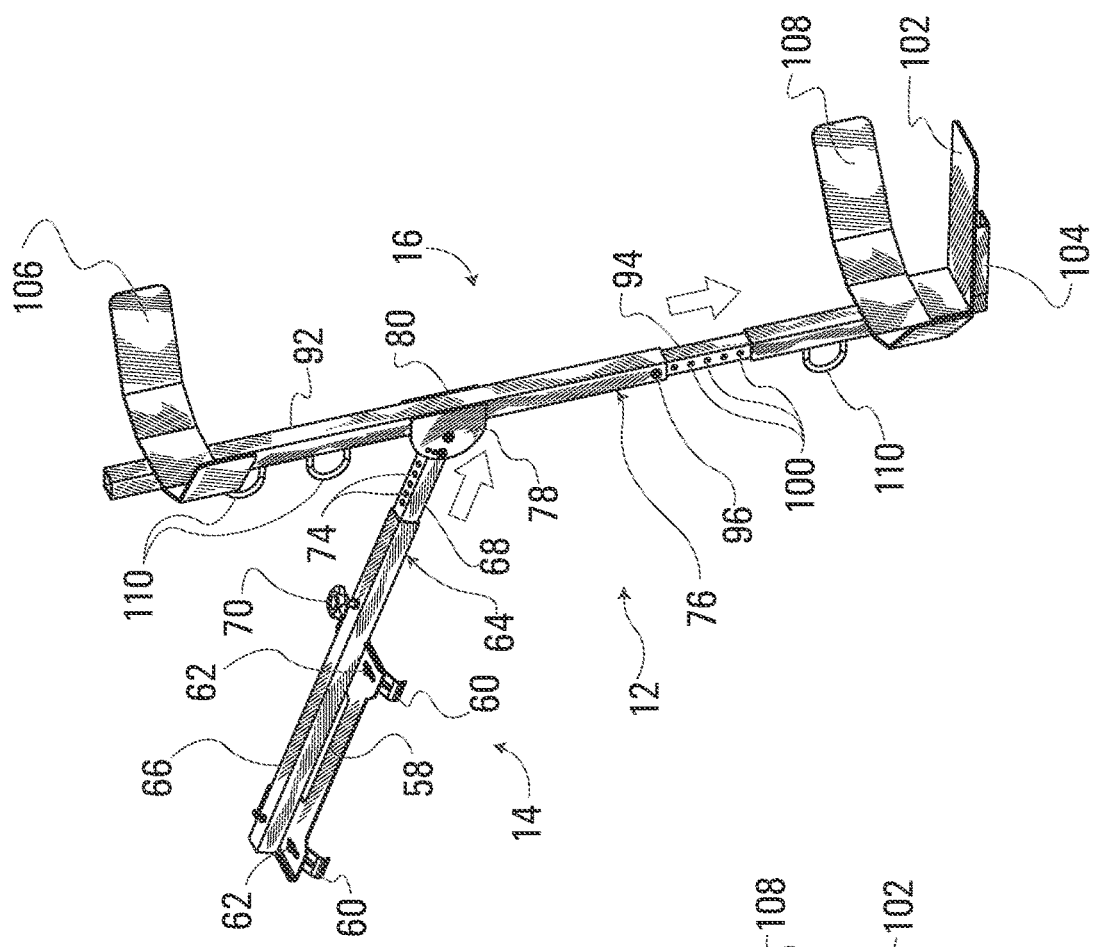
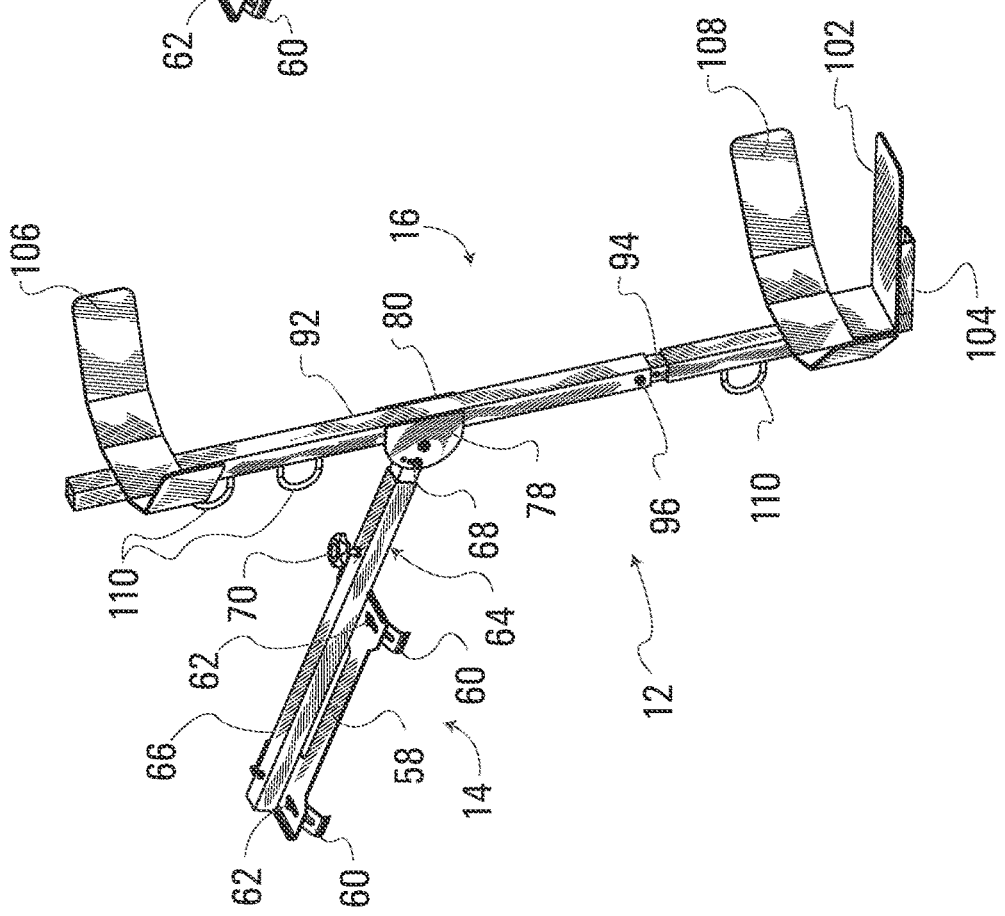
FIG. 3A
FIG. 3B

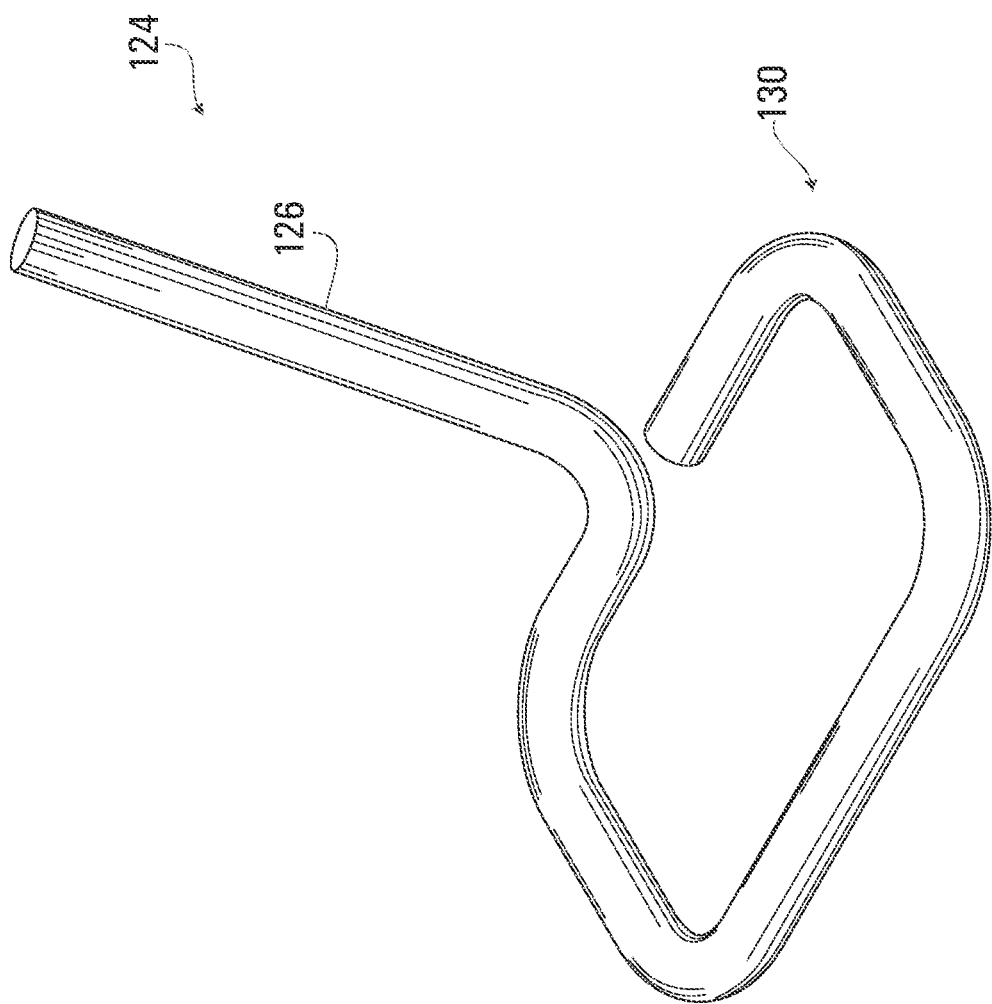

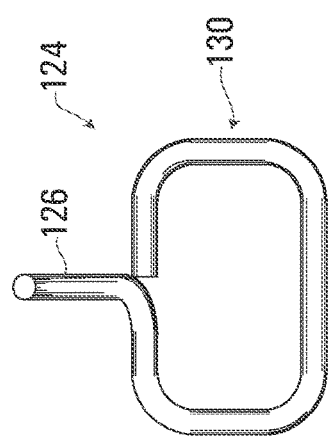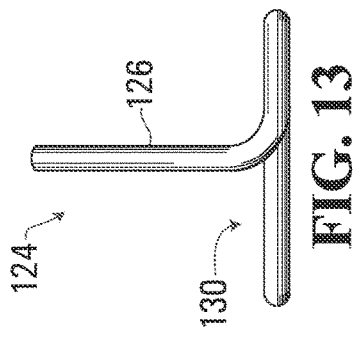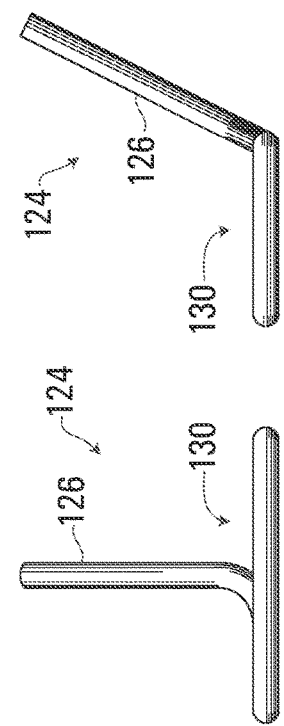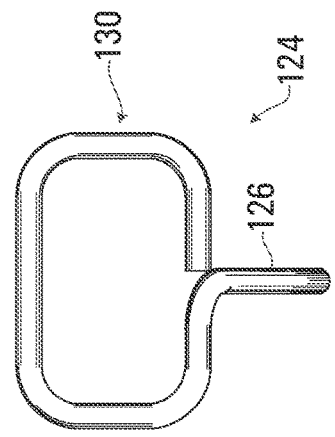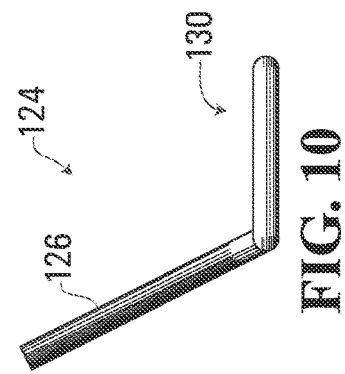

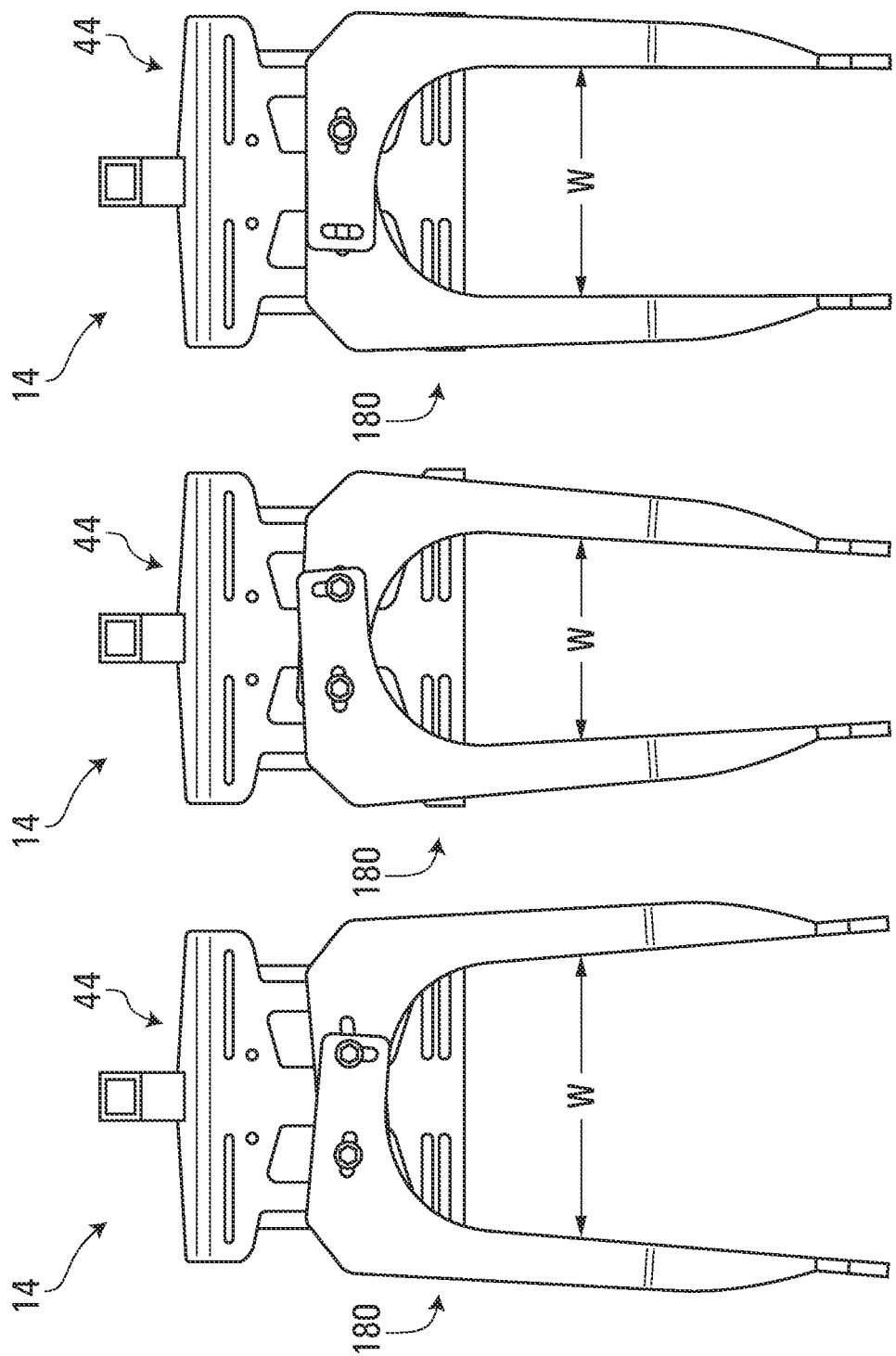

SYSTEMS AND METHODS FOR BICYCLES AND OTHER VEHICLES TO CARRY GOLF BAGS

CROSS-REFERENCE TO RELATED APPLICATION

This application claims priority from U.S. Provisional Patent Application 63/039,726 filed on Jun. 16, 2020 and U.S. Design patent application 29/762,090 filed on Dec. 15, 2020, both of which are incorporated by reference herein.

FIELD OF DISCLOSURE

This disclosure relates generally to systems and methods for vehicles such as bicycles to carry golf bags to, from, and/or on golf courses.

BACKGROUND

Golfers have golf bags to contain and transport their golf clubs and other golf gear to, from, and on golf courses.

While playing, golfers' golf bags can be moved around golf courses in various ways, such as by using motorized golf carts, personally carrying them, and/or employing caddies.

Some attempts have also been made to connect golf bags to other vehicles such as bicycles so that the bicycles can carry the golf bags. Although interesting (e.g., in that they combine bicycling and golfing and facilitate carrying golf bags, can allow more players with their own vehicles, etc.), these bicycle-related attempts present many issues, including ease of use, stability, etc.

For at least these and other reasons, improvements for bicycles to carry golf bags would be welcomed.

SUMMARY

According to various aspects, this disclosure relates to a system for a bicycle or other vehicle to carry a golf bag, such as to, from, and on a golf course, in which the system can facilitate its use and transportation of the golf bag, such as by providing adjustability (e.g., to adjust how the golf bag is positioned), stability (e.g., to properly distribute weight and/or adapt to irregularity, softness, and/or other conditions of a ground surface), and/or other benefits.

For example, according to one aspect, this disclosure relates to a golf-bag carrier for a bicycle to carry a golf bag. The bicycle comprises a front wheel, a rear wheel, a frame, and a seat, the front wheel and the rear wheel being configured to roll on a ground surface. The golf-bag carrier comprises: a base configured to be connected to the bicycle; and a holder connected to the base and configured to hold the golf bag such that the golf bag is supported on the ground surface only by the front wheel and the rear wheel while the bicycle travels on the ground surface. The holder is adjustable relative to the base for adjusting the golf bag relative to the bicycle.

According to another aspect, this disclosure relates to a golf-bag carrier for a bicycle to carry a golf bag. The bicycle comprises a front wheel, a rear wheel, a frame, and a seat, the front wheel and the rear wheel being configured to roll on a ground surface. The golf-bag carrier comprises: a base configured to be connected to the bicycle; and a holder connected to the base and configured to hold the golf bag such that the golf bag is supported on the ground surface only by the front wheel and the rear wheel while the bicycle travels on the ground surface. At least part of the holder is pivotable relative to the base to adjust the holder relative to the base for adjusting the golf bag relative to the bicycle.

According to another aspect, this disclosure relates to a golf-bag carrier for a bicycle to carry a golf bag. The bicycle comprises a front wheel, a rear wheel, a frame, and a seat, the front wheel and the rear wheel being configured to roll on a ground surface. The golf-bag carrier comprises: a base configured to be connected to the bicycle; and a holder connected to the base and configured to hold the golf bag such that the golf bag is supported on the ground surface only by the front wheel and the rear wheel while the bicycle travels on the ground surface. At least part of the holder is translatable relative to the base and at least part of the holder is pivotable relative to the base to adjust the holder relative to the base for adjusting the golf bag relative to the bicycle.

According to another aspect, this disclosure relates to a golf-bag carrier for a bicycle to carry a golf bag. The bicycle comprises a front wheel, a rear wheel, a frame, and a seat, the front wheel and the rear wheel being configured to roll on a ground surface. The golf-bag carrier comprises: a base configured to be connected to the bicycle; and a holder connected to the base and configured to hold the golf bag such that the golf bag is supported on the ground surface only by the front wheel and the rear wheel while the bicycle travels on the ground surface. The holder is adjustable relative to the base for adjusting an angular position of the golf bag relative to the bicycle.

According to another aspect, this disclosure relates to a golf-bag carrier for a bicycle to carry a golf bag. The bicycle comprises a front wheel, a rear wheel, a frame, and a seat, the front wheel and the rear wheel being configured to roll on a ground surface. The golf-bag carrier comprises: a base configured to be connected to the bicycle; and a holder connected to the base and configured to hold the golf bag such that the golf bag is supported on the ground surface only by the front wheel and the rear wheel while the bicycle travels on the ground surface. The holder is adjustable relative to the base for adjusting a linear position of the golf bag relative to the bicycle in a longitudinal direction of the bicycle and adjusting an angular position of the golf bag relative to the bicycle.

According to another aspect, this disclosure relates to a golf-bag carrier for a bicycle to carry a golf bag. The bicycle comprises a front wheel, a rear wheel, a frame, and a seat, the front wheel and the rear wheel being configured to roll on a ground surface. The golf bag is mounted to a golf-bag cart that comprises a plurality of cart wheels configured to roll on the ground surface. The golf-bag carrier comprises: a base configured to be connected to the bicycle; and a holder connected to the base and comprising a hitch connectable to the golf-bag cart to pull the golf-bag cart behind the bicycle. The hitch is configured to allow the golf-bag cart to move relative to the bicycle while the golf-bag cart is pulled by the bicycle.

According to another aspect, this disclosure relates to a golf-bag carrier for a bicycle to carry a golf bag. The bicycle comprises a front wheel, a rear wheel, a frame, and a seat, the front wheel and the rear wheel being configured to roll on a ground surface. The golf bag is mounted to a golf-bag cart that comprises a plurality of cart wheels configured to roll on the ground surface. The golf-bag carrier comprises: a base configured to be connected to the bicycle; and a holder connected to the base and comprising a hitch connectable to the golf-bag cart to pull the golf-bag cart behind the bicycle. The hitch is configured to allow the golf-bag cart to pivot relative to the bicycle about at least one axis of rotation while the golf-bag cart is pulled by the bicycle.

According to another aspect, this disclosure relates to a golf-bag carrier for a bicycle to carry a golf bag. The bicycle comprises a front wheel, a rear wheel, a frame, and a seat, the front wheel and the rear wheel being configured to roll on a ground surface. The golf bag is mounted to a golf-bag cart that comprises a plurality of cart wheels configured to roll on the ground surface. The golf-bag carrier comprises: a base configured to be connected to the bicycle; and a holder connected to the base and comprising a hitch connectable to the golf-bag cart to pull the golf-bag cart behind the bicycle. The hitch is configured to allow the golf-bag cart to pivot relative to the bicycle about a plurality of axes of rotation while the golf-bag cart is pulled by the bicycle.

According to another aspect, this disclosure relates to a golf-bag carrier for a bicycle to carry a golf bag. The bicycle comprises a front wheel, a rear wheel, a frame, and a seat, the front wheel and the rear wheel being configured to roll on a ground surface. The golf bag is mounted to a golf-bag cart that comprises a plurality of cart wheels configured to roll on the ground surface. The golf-bag carrier comprises: a base configured to be connected to the bicycle; and a holder connected to the base and comprising a hitch connectable to the golf-bag cart to pull the golf-bag cart behind the bicycle. The hitch is configured to allow pitch, roll, and yaw of the golf-bag cart relative to the bicycle while the golf-bag cart is pulled by the bicycle.

According to another aspect, this disclosure relates to a golf-bag carrier for a bicycle to carry a golf bag. The bicycle comprising a front wheel, a rear wheel, a frame, and a seat, the front wheel and the rear wheel being configured to roll on a ground surface. The golf-bag carrier comprises: a base configured to be connected to the bicycle; and a holder connected to the base and configured to hold the golf bag. At least part of the holder is pivotable relative to the base to change a position of the golf bag relative to the bicycle.

According to another aspect, this disclosure relates to a bicycle kickstand for maintaining a bicycle upright on a ground surface. The bicycle kickstand comprises: a leg configured to be connected to the bicycle; and a foot connected to the leg, configured to contact the ground surface, and dimensioned such that a span of an area of contact of the bicycle kickstand with the ground surface is at least three times a dimension of a cross-section of the leg normal to a longitudinal axis of the leg.

According to another aspect, this disclosure relates to a bicycle kickstand for maintaining a bicycle upright on a ground surface. The bicycle kickstand comprises: a leg configured to be connected to the bicycle; and a foot connected to the leg, configured to contact the ground surface, and dimensioned to prevent sinking of the bicycle kickstand into the ground surface when the bicycle carries a golf bag.

According to another aspect, this disclosure relates to a bicycle kickstand for maintaining a bicycle upright on a ground surface. The bicycle kickstand comprises: a leg configured to be connected to the bicycle; and a foot connected to the leg, configured to contact the ground surface, and dimensioned such that, when a gross weight of the bicycle is at least 23 kg, a pressure exerted by the foot on the ground surface is no more than 12.5 kPa.

According to another aspect, this disclosure relates to a bicycle kickstand for maintaining a bicycle upright on a ground surface. The bicycle kickstand comprises: a leg configured to be connected to the bicycle; and a foot connected to the leg and configured to contact the ground surface. The foot is removable from the leg. An area of contact of the foot with the ground surface is larger than an area of contact of an end of the leg with the ground surface when the foot is removed from the leg.

According to another aspect, this disclosure relates to a bicycle kickstand for maintaining a bicycle upright on a ground surface. The bicycle being initially provided with an initial bicycle kickstand, the bicycle kickstand being configured to replace the initial bicycle kickstand. The bicycle kickstand comprises: a leg configured to be connected to the bicycle; and a foot connected to the leg and configured to contact the ground surface. An area of contact of the bicycle kickstand with the ground surface is greater than an area of contact of the initial bicycle kickstand with the ground surface.

According to another aspect, this disclosure relates to a system for a bicycle to carry a golf bag. The bicycle comprises a front wheel, a rear wheel, a frame, and a seat, the front wheel and the rear wheel being configured to roll on a ground surface. The system comprises a golf-bag carrier for carrying the golf bag. The golf-bag carrier comprises: a base configured to be connected to the bicycle; and a holder connected to the base and configured to hold the golf bag. The system comprises a bicycle kickstand for maintaining the bicycle upright on the ground surface when the golf-bag carrier is mounted to the bicycle and carries the golf bag.

According to another aspect, this disclosure relates to a golf-bag carrier for a two-wheel vehicle to carry a golf bag. The two-wheel vehicle comprises a front wheel, a rear wheel, a frame, and a seat. The front wheel and the rear wheel are configured to roll on a ground surface. The golf-bag carrier comprises: a base configured to be connected to the two-wheel vehicle; and a holder connected to the base and configured to hold the golf bag such that the golf bag is supported on the ground surface only by the front wheel and the rear wheel while the two-wheel vehicle travels on the ground surface. The holder is adjustable relative to the base for adjusting the golf bag relative to the two-wheel vehicle.

According to another aspect, this disclosure relates to a golf-bag carrier for a two-wheel vehicle to carry a golf bag. The two-wheel vehicle comprises a front wheel, a rear wheel, a frame, and a seat. The front wheel and the rear wheel are configured to roll on a ground surface. The golf-bag carrier comprises: a base configured to be connected to the two-wheel vehicle; and a holder connected to the base and configured to hold the golf bag such that the golf bag is supported on the ground surface only by the front wheel and the rear wheel while the two-wheel vehicle travels on the ground surface. At least part of the holder is pivotable relative to the base to adjust the holder relative to the base for adjusting the golf bag relative to the two-wheel vehicle.

According to another aspect, this disclosure relates to a golf-bag carrier for a two-wheel vehicle to carry a golf bag. The two-wheel vehicle comprises a front wheel, a rear wheel, a frame, and a seat. The front wheel and the rear wheel is configured to roll on a ground surface. The golf-bag carrier comprises: a base configured to be connected to the two-wheel vehicle; and a holder connected to the base and configured to hold the golf bag such that the golf bag is supported on the ground surface only by the front wheel and the rear wheel while the two-wheel vehicle travels on the ground surface. At least part of the holder is translatable relative to the base and at least part of the holder is pivotable relative to the base to adjust the holder relative to the base for adjusting the golf bag relative to the two-wheel vehicle.

According to another aspect, this disclosure relates to a golf-bag carrier for a two-wheel vehicle to carry a golf bag. The two-wheel vehicle comprises a front wheel, a rear wheel, a frame, and a seat. The front wheel and the rear wheel are configured to roll on a ground surface. The golf-bag carrier comprises: a base configured to be connected to the two-wheel vehicle; and a holder connected to the base and configured to hold the golf bag such that the golf bag is supported on the ground surface only by the front wheel and the rear wheel while the two-wheel vehicle travels on the ground surface. The holder is adjustable relative to the base for adjusting an angular position of the golf bag relative to the two-wheel vehicle.

According to another aspect, this disclosure relates to a golf-bag carrier for a two-wheel vehicle to carry a golf bag. The two-wheel vehicle comprises a front wheel, a rear wheel, a frame, and a seat. The front wheel and the rear wheel are configured to roll on a ground surface. The golf-bag carrier comprises: a base configured to be connected to the two-wheel vehicle; and a holder connected to the base and configured to hold the golf bag such that the golf bag is supported on the ground surface only by the front wheel and the rear wheel while the two-wheel vehicle travels on the ground surface. The holder is adjustable relative to the base for adjusting a linear position of the golf bag relative to the two-wheel vehicle in a longitudinal direction of the two-wheel vehicle and adjusting an angular position of the golf bag relative to the two-wheel vehicle.

According to another aspect, this disclosure relates to a golf-bag carrier for a two-wheel vehicle to carry a golf bag. The two-wheel vehicle comprises a front wheel, a rear wheel, a frame, and a seat. The front wheel and the rear wheel are configured to roll on a ground surface. The golf bag is mounted to a golf-bag cart that comprises a plurality of cart wheels configured to roll on the ground surface. The golf-bag carrier comprises: a base configured to be connected to the two-wheel vehicle; and a holder connected to the base and comprising a hitch connectable to the golf-bag cart to pull the golf-bag cart behind the two-wheel vehicle. The hitch is configured to allow the golf-bag cart to move relative to the two-wheel vehicle while the golf-bag cart is pulled by the two-wheel vehicle.

According to another aspect, this disclosure relates to a golf-bag carrier for a two-wheel vehicle to carry a golf bag. The two-wheel vehicle comprises a front wheel, a rear wheel, a frame, and a seat. The front wheel and the rear wheel are configured to roll on a ground surface. The golf bag is mounted to a golf-bag cart that comprises a plurality of cart wheels configured to roll on the ground surface. The golf-bag carrier comprises: a base configured to be connected to the two-wheel vehicle; and a holder connected to the base and comprising a hitch connectable to the golf-bag cart to pull the golf-bag cart behind the two-wheel vehicle. The hitch is configured to allow the golf-bag cart to pivot relative to the two-wheel vehicle about at least one axis of rotation while the golf-bag cart is pulled by the two-wheel vehicle.

According to another aspect, this disclosure relates to a golf-bag carrier for a two-wheel vehicle to carry a golf bag. The two-wheel vehicle comprises a front wheel, a rear wheel, a frame, and a seat. The front wheel and the rear wheel are configured to roll on a ground surface. The golf bag is mounted to a golf-bag cart that comprises a plurality of cart wheels configured to roll on the ground surface. The golf-bag carrier comprises: a base configured to be connected to the two-wheel vehicle; and a holder connected to the base and comprising a hitch connectable to the golf-bag cart to pull the golf-bag cart behind the two-wheel vehicle. The hitch is configured to allow the golf-bag cart to pivot relative to the two-wheel vehicle about a plurality of axes of rotation while the golf-bag cart is pulled by the two-wheel vehicle.

According to another aspect, this disclosure relates to a golf-bag carrier for a two-wheel vehicle to carry a golf bag. The two-wheel vehicle comprises a front wheel, a rear wheel, a frame, and a seat. The front wheel and the rear wheel are configured to roll on a ground surface. The golf bag is mounted to a golf-bag cart that comprises a plurality of cart wheels configured to roll on the ground surface. The golf-bag carrier comprises: a base configured to be connected to the two-wheel vehicle; and a holder connected to the base and comprising a hitch connectable to the golf-bag cart to pull the golf-bag cart behind the two-wheel vehicle. The hitch is configured to allow pitch, roll, and yaw of the golf-bag cart relative to the two-wheel vehicle while the golf-bag cart is pulled by the two-wheel vehicle.

According to another aspect, this disclosure relates to a golf-bag carrier for a two-wheel vehicle to carry a golf bag. The two-wheel vehicle comprises a front wheel, a rear wheel, a frame, and a seat. The front wheel and the rear wheel are configured to roll on a ground surface. The golf-bag carrier comprises: a base configured to be connected to the two-wheel vehicle; and a holder connected to the base and configured to hold the golf bag. At least part of the holder is pivotable relative to the base to change a position of the golf bag relative to the two-wheel vehicle.

According to another aspect, this disclosure relates to a kickstand for maintaining a two-wheel vehicle upright on a ground surface, the kickstand comprising: a leg configured to be connected to the two-wheel vehicle; and a foot connected to the leg, configured to contact the ground surface, and dimensioned such that a span of an area of contact of the kickstand with the ground surface is at least three times a dimension of a cross-section of the leg normal to a longitudinal axis of the leg.

According to another aspect, this disclosure relates to a kickstand for maintaining a two-wheel vehicle upright on a ground surface, the kickstand comprising: a leg configured to be connected to the two-wheel vehicle; and a foot connected to the leg, configured to contact the ground surface, and dimensioned to prevent sinking of the kickstand into the ground surface when the two-wheel vehicle carries a golf bag.

According to another aspect, this disclosure relates to a kickstand for maintaining a two-wheel vehicle upright on a ground surface, the kickstand comprising: a leg configured to be connected to the two-wheel vehicle; and a foot connected to the leg, configured to contact the ground surface, and dimensioned such that, when a gross weight of the two-wheel vehicle is at least 23 kg, a pressure exerted by the foot on the ground surface is no more than 12.5 kPa.

According to another aspect, this disclosure relates to a kickstand for maintaining a two-wheel vehicle upright on a ground surface, the kickstand comprising: a leg configured to be connected to the two-wheel vehicle; and a foot connected to the leg and configured to contact the ground surface. The foot is removable from the leg; and an area of contact of the foot with the ground surface is larger than an area of contact of an end of the leg with the ground surface when the foot is removed from the leg.

According to another aspect, this disclosure relates to a kickstand for maintaining a two-wheel vehicle upright on a ground surface, the being initially provided with an initial kickstand. The kickstand is configured to replace the initial kickstand. The kickstand comprises: a leg configured to be connected to the two-wheel vehicle; and a foot connected to the leg and configured to contact the ground surface. An area of contact of the kickstand with the ground surface is greater than an area of contact of the initial kickstand with the ground surface.

According to another aspect, this disclosure relates to a system for a two-wheel vehicle to carry a golf bag. The two-wheel vehicle comprises a front wheel, a rear wheel, a frame, and a seat. The front wheel and the rear wheel are configured to roll on a ground surface. The system comprises a golf-bag carrier for carrying the golf bag, the golf-bag carrier comprising: a base configured to be connected to the two-wheel vehicle; and a holder connected to the base and configured to hold the golf bag. The system comprises a kickstand for maintaining the two-wheel vehicle upright on the ground surface when the golf-bag carrier is mounted to the two-wheel vehicle and carries the golf bag.

According to another aspect, this disclosure relates to a golf-bag carrier for a two-wheel vehicle to carry a golf bag. The two-wheel vehicle comprises a front wheel, a rear wheel, a frame, and a seat. The front wheel and the rear wheel are configured to roll on a ground surface. The golf-bag carrier comprises: a base configured to be connected to the two-wheel vehicle; and a holder connected to the base and configured to hold the golf bag such that the golf bag is supported on the ground surface only by the front wheel and the rear wheel while the two-wheel vehicle travels on the ground surface. The holder is adjustable relative to the base for adjusting the golf bag relative to the two-wheel vehicle.

According to another aspect, this disclosure relates to a golf-bag carrier for a two-wheel vehicle to carry a golf bag. The two-wheel vehicle comprises a front wheel, a rear wheel, a frame, and a seat. The front wheel and the rear wheel are configured to roll on a ground surface. The golf-bag carrier comprises: a base configured to be connected to the two-wheel vehicle; and a holder connected to the base and configured to hold the golf bag such that the golf bag is supported on the ground surface only by the front wheel and the rear wheel while the two-wheel vehicle travels on the ground surface. At least part of the holder is pivotable relative to the base to adjust the holder relative to the base for adjusting the golf bag relative to the two-wheel vehicle.

According to another aspect, this disclosure relates to a golf-bag carrier for a two-wheel vehicle to carry a golf bag. The two-wheel vehicle comprises a front wheel, a rear wheel, a frame, and a seat. The front wheel and the rear wheel are configured to roll on a ground surface. The golf-bag carrier comprises: a base configured to be connected to the two-wheel vehicle; and a holder connected to the base and configured to hold the golf bag such that the golf bag is supported on the ground surface only by the front wheel and the rear wheel while the two-wheel vehicle travels on the ground surface. At least part of the holder is translatable relative to the base and at least part of the holder is pivotable relative to the base to adjust the holder relative to the base for adjusting the golf bag relative to the two-wheel vehicle.

According to another aspect, this disclosure relates to a golf-bag carrier for a two-wheel vehicle to carry a golf bag. The two-wheel vehicle comprises a front wheel, a rear wheel, a frame, and a seat. The front wheel and the rear wheel are configured to roll on a ground surface. The golf-bag carrier comprises: a base configured to be connected to the two-wheel vehicle; and a holder connected to the base and configured to hold the golf bag such that the golf bag is supported on the ground surface only by the front wheel and the rear wheel while the two-wheel vehicle travels on the ground surface. The holder is adjustable relative to the base for adjusting an angular position of the golf bag relative to the two-wheel vehicle.

According to another aspect, this disclosure relates to a golf-bag carrier for a two-wheel vehicle to carry a golf bag. The two-wheel vehicle comprises a front wheel, a rear wheel, a frame, and a seat. The front wheel and the rear wheel are configured to roll on a ground surface. The golf-bag carrier comprises: a base configured to be connected to the two-wheel vehicle; and a holder connected to the base and configured to hold the golf bag such that the golf bag is supported on the ground surface only by the front wheel and the rear wheel while the two-wheel vehicle travels on the ground surface. The holder is adjustable relative to the base for adjusting a linear position of the golf bag relative to the two-wheel vehicle in a longitudinal direction of the two-wheel vehicle and adjusting an angular position of the golf bag relative to the two-wheel vehicle.

According to another aspect, this disclosure relates to a golf-bag carrier for a two-wheel vehicle to carry a golf bag. The two-wheel vehicle comprises a front wheel, a rear wheel, a frame, and a seat. The front wheel and the rear wheel are configured to roll on a ground surface. The golf bag is mounted to a golf-bag cart that comprises a plurality of cart wheels configured to roll on the ground surface. The golf-bag carrier comprises: a base configured to be connected to the two-wheel vehicle; and a holder connected to the base and comprising a hitch connectable to the golf-bag cart to pull the golf-bag cart behind the two-wheel vehicle. The hitch is configured to allow the golf-bag cart to move relative to the two-wheel vehicle while the golf-bag cart is pulled by the two-wheel vehicle.

According to another aspect, this disclosure relates to a golf-bag carrier for a two-wheel vehicle to carry a golf bag. The two-wheel vehicle comprises a front wheel, a rear wheel, a frame, and a seat. The front wheel and the rear wheel are configured to roll on a ground surface. The golf bag is mounted to a golf-bag cart that comprises a plurality of cart wheels configured to roll on the ground surface. The golf-bag carrier comprises: a base configured to be connected to the vehicle; and a holder connected to the base and comprising a hitch connectable to the golf-bag cart to pull the golf-bag cart behind the vehicle. The hitch is configured to allow the golf-bag cart to pivot relative to the vehicle about at least one axis of rotation while the golf-bag cart is pulled by the vehicle.

According to another aspect, this disclosure relates to a golf-bag carrier for a two-wheel vehicle to carry a golf bag. The two-wheel vehicle comprises a front wheel, a rear wheel, a frame, and a seat. The front wheel and the rear wheel are configured to roll on a ground surface. The golf bag is mounted to a golf-bag cart that comprises a plurality of cart wheels configured to roll on the ground surface. The golf-bag carrier comprises: a base configured to be connected to the vehicle; and a holder connected to the base and comprising a hitch connectable to the golf-bag cart to pull the golf-bag cart behind the vehicle. The hitch is configured to allow the golf-bag cart to pivot relative to the vehicle about a plurality of axes of rotation while the golf-bag cart is pulled by the vehicle.

According to another aspect, this disclosure relates to a golf-bag carrier for a two-wheel vehicle to carry a golf bag.

The two-wheel vehicle comprises a front wheel, a rear wheel, a frame, and a seat. The front wheel and the rear wheel are configured to roll on a ground surface. The golf bag is mounted to a golf-bag cart that comprises a plurality of cart wheels configured to roll on the ground surface. The golf-bag carrier comprises: a base configured to be connected to the vehicle; and a holder connected to the base and comprising a hitch connectable to the golf-bag cart to pull the golf-bag cart behind the vehicle. The hitch is configured to allow pitch, roll, and yaw of the golf-bag cart relative to the vehicle while the golf-bag cart is pulled by the vehicle.

According to another aspect, this disclosure relates to a golf-bag carrier for a two-wheel vehicle to carry a golf bag. The two-wheel vehicle comprises a front wheel, a rear wheel, a frame, and a seat. The front wheel and the rear wheel are configured to roll on a ground surface. The golf-bag carrier comprises: a base configured to be connected to the vehicle; and a holder connected to the base and configured to hold the golf bag. At least part of the holder is pivotable relative to the base to change a position of the golf bag relative to the vehicle.

According to another aspect, this disclosure relates to a bicycle for a user. The bicycle comprises a front wheel, a rear wheel, a frame, a seat, and an electric drive system that is configured to provide powered assistance to the user as the user rides the bicycle. The electric drive system comprises an electric motor, a battery, and a control system that is configured to operate the electric drive system differently depending on whether the bicycle is carrying a golf bag.

According to another aspect, this disclosure relates to a two-wheel vehicle for a user. The two-wheel vehicle comprises a front wheel, a rear wheel, a frame, a seat, and an electric drive system that is configured to provide power for moving the two-wheel vehicle. The electric drive system comprises an electric motor, a battery, and a control system that is configured to operate the electric drive system differently depending on whether the two-wheel vehicle is carrying a golf bag.

According to another aspect, this disclosure relates to a vehicle for a user. The vehicle comprises a plurality of wheels, a frame, a seat, and an electric drive system that is configured to provide power for moving the vehicle. The electric drive system comprises an electric motor, a battery, and a control system that is configured to operate the electric drive system differently depending on whether the vehicle is carrying a golf bag.

These and other aspects of this disclosure will now become apparent to those of ordinary skill in the art upon review of a description of embodiments that follows in conjunction with accompanying drawings.

BRIEF DESCRIPTION OF DRAWINGS

A detailed description of embodiments is provided below, by way of example only, with reference to the accompanying drawings, in which:

FIG. 3A shows a perspective view of the golf-bag carrier, comprising a base and a holder, in which the base and the holder are in a longitudinally retracted configuration;

FIG. 3B shows a perspective view of the golf-bag carrier, in which the base and the holder are in a longitudinally expanded configuration;

FIGS. 8 to 14 show respectively a top perspective view, a top plan view, a left side elevational view, a front elevational view, a right side elevational view, a rear elevational view and a bottom plan view of the foot of the bicycle kickstand;

FIGS. 35 to 37 show the reinforcement in different configurations allowing use with wheels of different widths;

It is to be expressly understood that the description and drawings are only for purposes of illustrating certain embodiments and are an aid for understanding. They are not intended to be and should not be limiting.

DETAILED DESCRIPTION OF EMBODIMENTS

Figure 1:
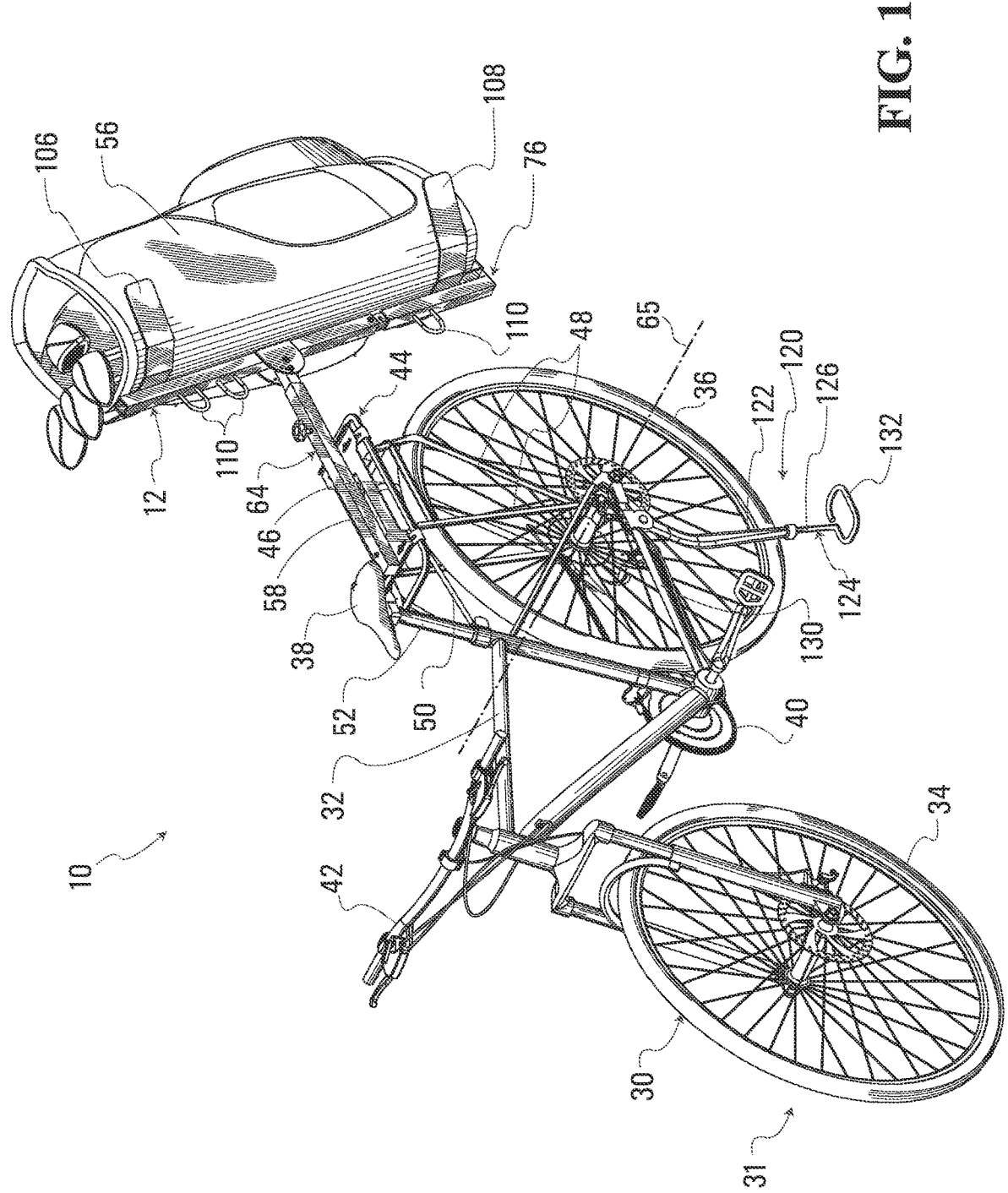
FIGS. 1 and 2 show respectively a perspective view and a side elevation of a system for a vehicle to carry a golf bag, according to an embodiment, in which the vehicle is a bicycle and the system comprises a golf-bag carrier.
Figure 2:
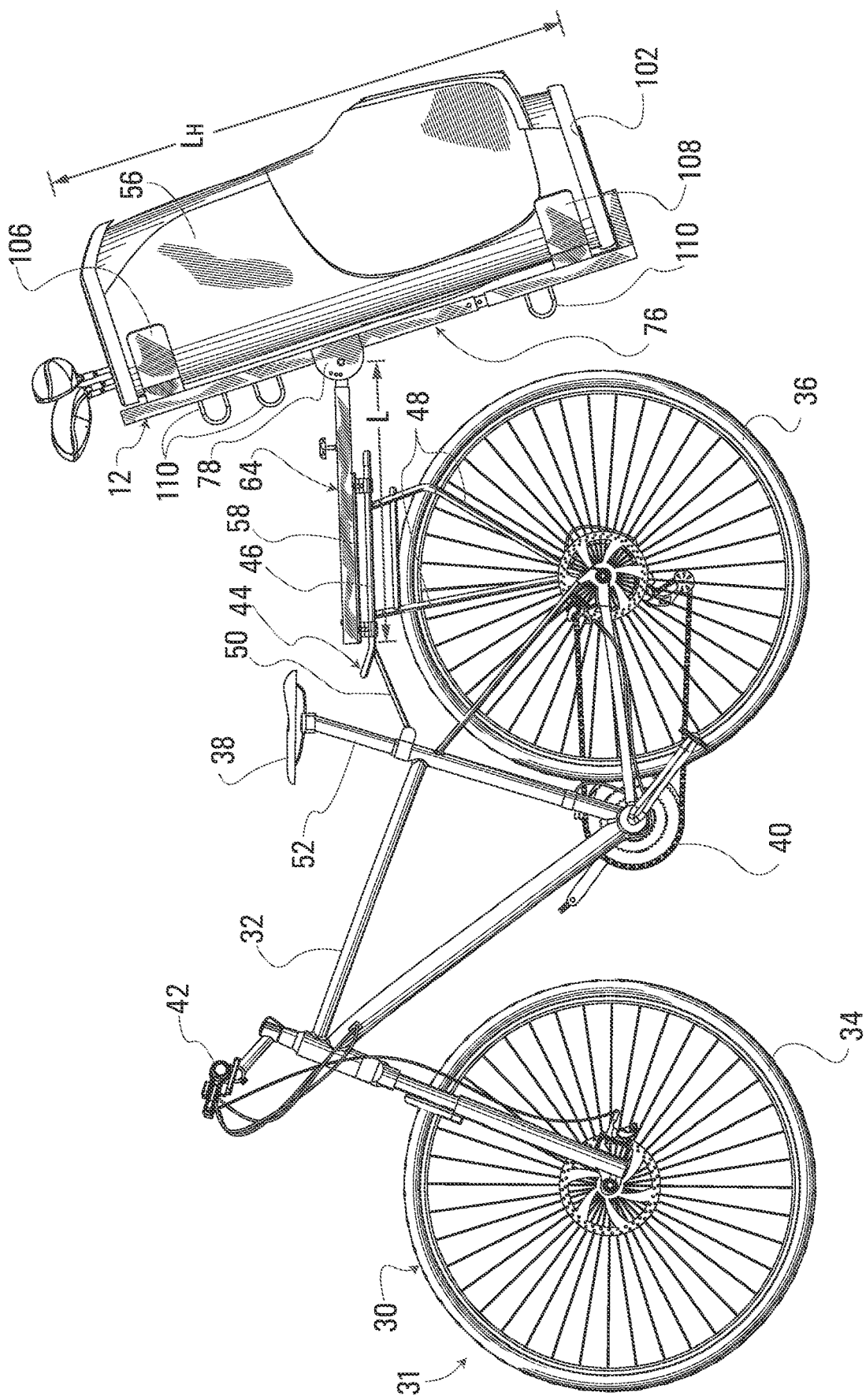
Figure 4:
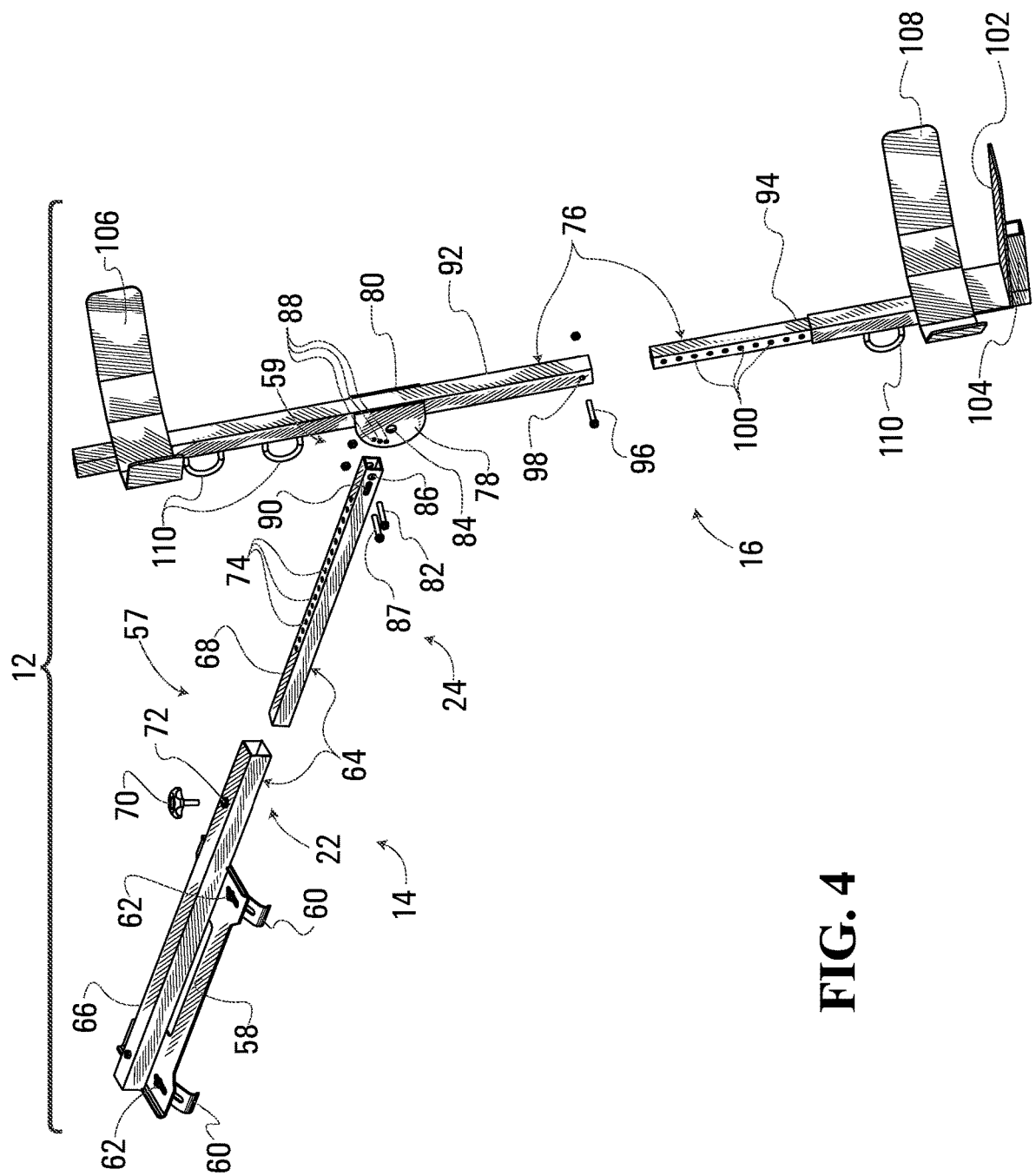
FIG. 4 shows an exploded perspective view of the golf-bag carrier.

FIGS. 1 and 2 show an embodiment of a system 10 for a vehicle 30 to carry a golf bag 56, such as to, from, and on a golf course. In this embodiment, the vehicle 30 is a bicycle. The system 10 is usable by a user, who may be a golfer or another person (e.g., a caddy, a parent, etc.) accompanying the golfer. In this embodiment, the system 10 comprises a golf-bag carrier 12 for the bicycle 30 to carry the golf bag 56. The golf-bag carrier 12 comprises a base 14 connected to the bicycle 30 and a holder 16 connected to the base 14 and configured to hold the golf bag 56. In this embodiment, the system 10 also comprises a bicycle kickstand 20 for maintaining the bicycle 30 upright on a ground surface when the golf-bag carrier 12 carries the golf bag 56.

As further discussed below, in this embodiment, the system 10 including the golf-bag carrier 12 can facilitate its use and transportation of the golf bag 56, such as by providing adjustability (e.g., to adjust how the golf bag 56 is positioned), stability (e.g., to properly distribute weight and/or adapt to irregularity, softness, and/or other conditions of the ground surface), and/or other benefits.

In this embodiment, the bicycle 30 is a conventional bicycle and comprises; a frame 32; a front wheel 34 and a rear wheel 36 configured to roll on the ground surface; a seat 38 (sometimes referred-to as "saddle"); a pedalling mechanism 40 including pedals and a chain drive; and handlebars 42. In this example, the frame 32 carries the wheels 34, 36, the seat 38, the pedalling mechanism 40 and the handlebars 42. The frame 32 of the bicycle 30 may also comprises stays, including a seat stay 50 and a chain stay 61.

The bicycle 30 may comprise a rack 44 connected to the frame 32 above the rear wheel 36 of the bicycle 30. The rack 44 may be a conventional rear bike rack, e.g., used to carry bicycle bags or other bicycle accessories. For instance, the rack 44 may be any one of several standard rack models, or could be custom made. In this embodiment, the rack 44 comprises a horizontal portion 63 extending horizontally above the rear wheel 36 of the bicycle 30. Also, in this embodiment, the rack 44 comprises a support structure 45 extending downwardly towards and configured to be fastened to the stay 50. In this example, the horizontal portion 63 comprises a rack plate 46 positioned horizontally over the rear wheel 36 by the support structure 45. In some cases the stay 50 may attach the rack plate 46 of the rack 44 to the frame 32 of the bicycle 30 immediately underneath the seat support post 52 (sometimes referred-to as "seat post" or "seat tube"). Thus, in this example, the stay 50 may be a seat stay. In some embodiments, the bicycle 30 may comprise other types of stay: for instance, in some embodiments, the stay 50 may be attached to the seat tube 52 instead of being attached to the bicycle frame 32 underneath seat tube 52 with self-tightening screws that facilitate installation of the bike rack 44; in some embodiments, the stay 50 may be carried by at least part of the golf-bag carrier 12 and may be attached to the seat tube 52; etc.

In this example, the support structure 45 of the rack 44 comprises a first support member 47 configured to be connected to the stay 50 on a first side of the rear wheel 36 and a second support member 49 configured to be connected to the stay 50 on a second side of the rear wheel 36 opposite to the first side of the rear wheel 36. In this embodiment, the first support member 47 is a left support member and comprises a first plurality of rods 48 (e.g., comprising two, three or more rods 48), and the second support member 49 (e.g., comprising two, three or more rods 48) is a right support member and comprises a second plurality of rods 48. More specifically, in this example, the support structure 45 comprises four support rods 48.

With additional reference to FIGS. 1 to 4, in this embodiment, the golf-bag carrier 12 is configured to be connected to the bicycle 30. More specifically, in this embodiment, the base 14 of the golf-bag carrier 12 is configured to be connected to the bicycle 30. More particularly, the base 14 of the golf-bag carrier 12 is configured to be connected to the rack 44 of the bicycle 30. In this example, the base 14 of the golf-bag carrier 12 is fastened to the rack 44 of the bicycle 30. In this case, the base 14 of the golf-bag carrier 12 is fastened to the rack plate 46 of the rack 44.

In this embodiment, the holder 16 is connected to the base 14 and configured to hold the golf bag 56 such that the golf bag 56 is supported on the ground surface only by the front wheel 34 and the rear wheel 36 while the bicycle 30 travels on the ground surface. Therefore, in this embodiment, the golf bag 56 is unsupported by any wheel under the golf bag 56 other than the front wheel 34 and the rear wheel 36 of the bicycle 30 while the bicycle 30 travels on the ground surface.

In this embodiment, the holder 16 is adjustable relative to the base 14 for adjusting the golf bag 56 relative to the bicycle 30. That is, it is for adjusting how the golf bag 56 is positioned in relation to the bicycle 30. A position of the golf bag 56 relative to the bicycle 30 is thus adjustable. For example, the position of the golf bag 56 relative to the bicycle 30 may include a linear position of the golf bag 56 relative to the bicycle 30 in a longitudinal direction of the bicycle 30. Additionally or alternatively, the position of the golf bag 56 relative to the bicycle 30 may include an angular position (i.e., inclination) of the golf bag 56 relative to the bicycle 30.

More particularly, in this embodiment, the golf-bag carrier 12 comprises an adjustment system 55 configured to adjust the holder 16 relative to the base 14. In this example, the adjustment system 55 comprises a first adjustment mechanism 57 configured to adjust the linear position of at least part of (i.e., part of, a majority of, or an entirety of) the holder 16 relative to the rear wheel 36 of the bicycle 30 in the longitudinal direction of the bicycle 30, and a second adjustment mechanism 59 configured to adjust the angular position of at least part of (i.e., part of, a majority of, or an entirety of) the holder 16 relative to the rear wheel 36 of the bicycle 30. In that sense, the first adjustment mechanism 57 may sometimes be referred to as a "linear" adjustment mechanism, while the second adjustment mechanism 59 may sometimes be referred to as an "angular" adjustment mechanism.

For instance, in this embodiment, the base 14 of the golf-bag carrier 12 comprises a carrier plate 58 that rests atop the rack plate 46 of the bike rack 44, and a fixed member 22 affixed to the carrier plate 58 and configured to be fixed relative to the rack 44. The base 14 of the golf-bag carrier 12 may comprise a plurality of connectors 60 spaced apart from one another and configured to fasten the carrier plate 58 of the base 14 to the rack 44 of the bicycle 30. The connectors 60 may be disposed on either side of the carrier plate 58 and configured to engage opposite lateral sides of the rack 44 to fasten the base 14 to the rack 44. For instance, the connectors 60 of the base may comprise clips 60 and fasteners 62 extending through the clips 60. In this example, the fasteners 62 are fastening bolts, and the base 14 of the golf-bag carrier 12 comprises four attachment clips 60 and four fasteners 62.

Figure 22:
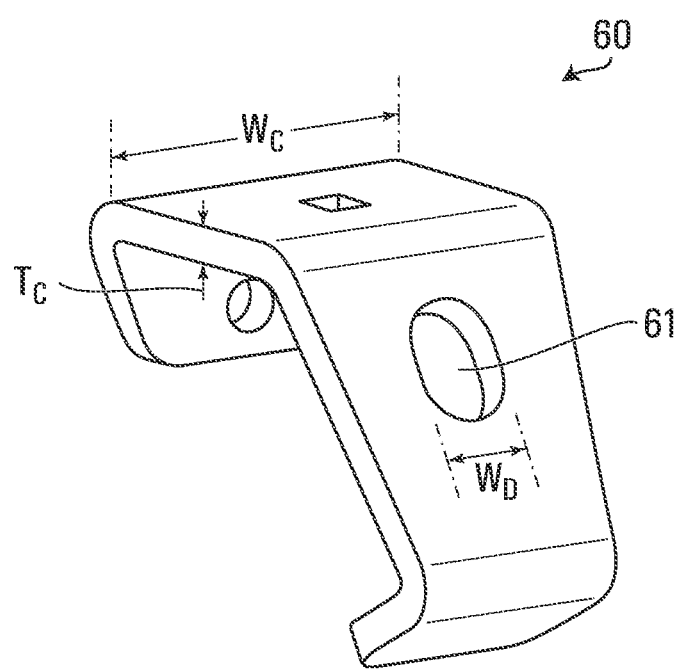
FIG. 22 shows a perspective view of an attachment clip of the base.

In this embodiment, as shown in FIG. 22 the attachment clips 60 may be reinforced to stabilize the golf-bag carrier 12 and/or the golf bag 56 to the bicycle 30 and to increase durability of the golf-bag carrier 12. For instance, the attachment clips 60 may comprise a material that is configured to increase a stiffness of the attachment dips 60. For example, the attachment dips 60 may comprise steel, aluminum, an aluminum alloy, titanium, an titanium alloy, etc. The attachment clips 60 may also have increased dimensions. For instance, in some embodiments, a thickness Tc of the attachment clips 60 may be of at least 3 mm, in some embodiments of at least 4 mm, in some embodiments of at least 5 mm, and in some embodiments even more (e.g., at least 6 mm). In some embodiments, a width $W_C$ of the attachment dips 60 may be of at least 30 mm, in some embodiments of at least 35 mm, in some embodiments of at least 40 mm, an in some embodiments of even more (e.g., of at least 45 mm). In some embodiments, a ratio of a width $W_o$ of a largest opening 61 of the attachment clips 60 over the width $W_C$ of the attachment clips 60 may be of at least 2.5, in some embodiments of at least 3, in some embodiments of at least 3.5, in some embodiments of at least 4, an in some embodiments of even more (e.g., of at least 4.5).

In this embodiment, the holder 16 comprises a movable member 24 adjustable relative to the fixed member 22 of the base 14, and the linear adjustment mechanism 57 of the adjustment system 55 is configured to adjust the movable member 24 of the holder 16 relative to the fixed member 22 of the base 14. In particular, at least part of the holder 16 may be translatable relative to the base 14 to adjust the holder 16 relative to the base 14. As such, the holder 16 may be adjustable relative to the base 14 for adjusting the linear position of the golf bag 56 relative to the bicycle 30 in the longitudinal direction of the bicycle 30. In this embodiment, the linear adjustment mechanism 57 is operable by the user toollessly (i.e., without requiring any tool such as screwdrivers, keys, etc.).

For example, in this embodiment, the movable member 24 of the holder 16 may be telescopically adjustable relative to the fixed member 22 of the base 14. For instance, the golf-bag carrier 12 may comprise an arm 64, the fixed member 22 of the base 14 may be a first portion of the arm 64; and the movable member 24 of the holder 16 may be a second portion of the arm 64 that is movable (e.g., telescopically movable) relative to the first portion of the arm 64 along a longitudinal axis of the arm 64.

For instance, in this example, the arm 64 may comprise a first arm tube 66 that is fixedly attached (e.g. welded) to the carrier plate 58 and a second arm tube 68 that snugly fits within the first arm tube 66 so as to slide within the first arm tube 66 in a telescopic fashion, the fixed member 22 of the base 14 may comprise the first arm tube 66, and the movable member 24 of the holder 16 may comprise the second arm tube 68. The first adjustment mechanism 57 of the golf-bag carrier 12 may comprise a set screw 70 provided with a knob to adjustably fix the position of the second arm tube 68 with respect to the first arm tube 66 by extending through a hole 72 of the first arm tube 66 and through a selected hole among several holes 74 of the second arm tube 68.

In this embodiment, the holder 16 comprises a post 76 and a plurality of holding members 77 spaced from one another along the post 76 to hold the golf bag 56. The post 76 may be connected to a free extremity of the second arm tube 68 by a connector 83. The angular adjustment mechanism 59 of the adjustment system 55 is configured such that at least part of the holder 16 is pivotable (i.e., rotatable about an axis of rotation) relative to the base 14 to adjust the holder 16 relative to the base 14, and thus the angular position of the holder 16 relative to the base 14. In this example, this is achieved by the angular adjustment mechanism 59 being configured to allow adjusting an angular position of the post 76, the holding members 77 and the golf bag 56 relative to the base 14, the second arm tube 68 of the holder 16 and the bicycle 30. In this embodiment, the angular adjustment mechanism 59 is operable by the user toollessly (i.e., without requiring any tool such as screwdrivers, keys, etc.).

Figure 5:
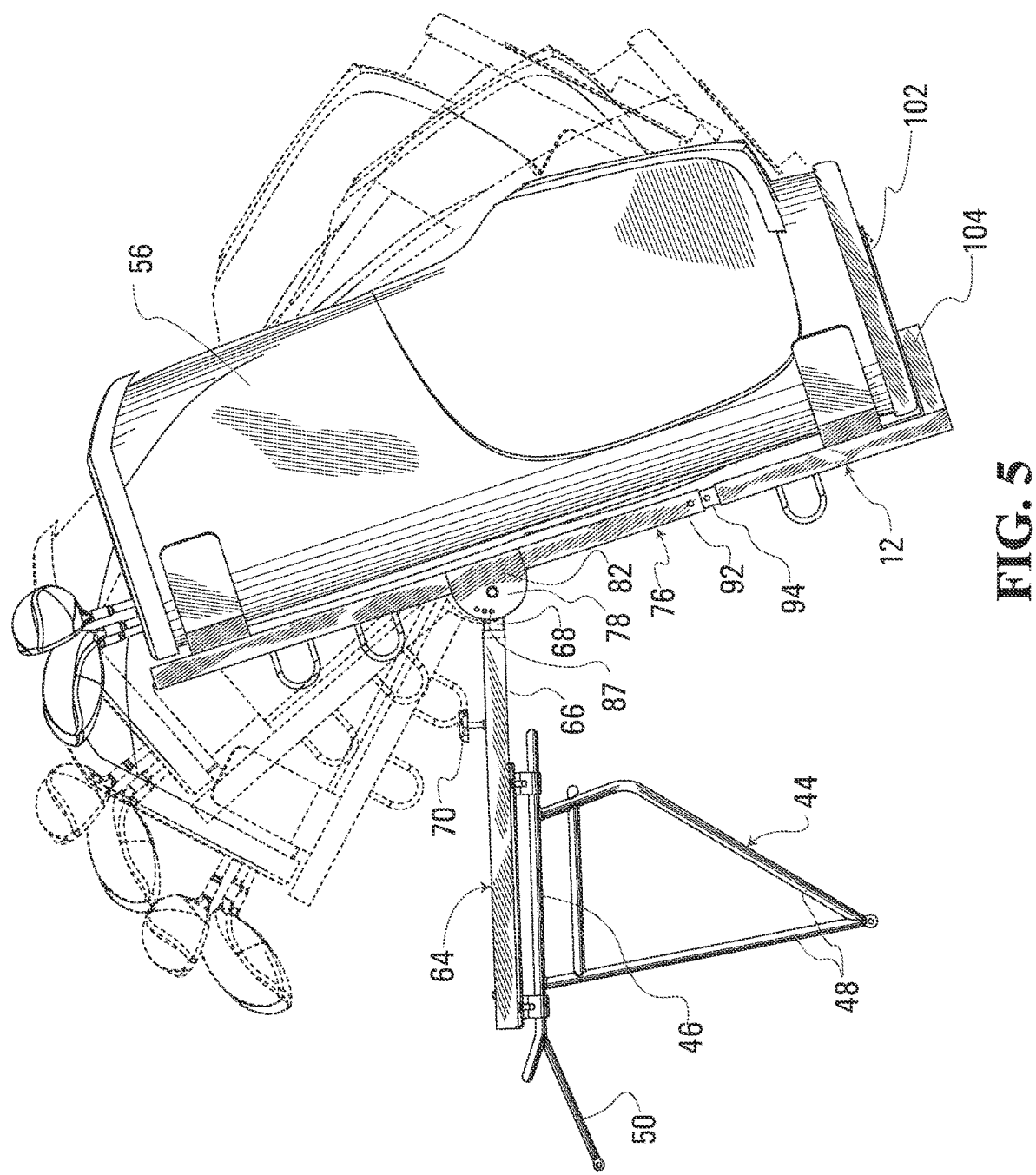
FIG. 5 shows a side elevation of the golf-bag carrier loaded with the golf bag, in which the holder of the golf-bag carrier comprises a fixed portion and a movable portion, and in which dotted lines show alternate angular configurations of the movable portion relative to the fixed portion.

For instance, in this embodiment, the connector 83 of the holder 16 is part of the angular adjustment mechanism 59 and comprises a pivot 93 configured to selectively allow and prevent pivoting of at least part of the holder 16 relative to the base 14 to adjust the inclination of the golf bag 56 relative to the bicycle 30. In this embodiment, the pivot 93 comprises a pair of pivot plates 78, 80 in the form of half-discs that are fixed to the post 76. The pivot plates 78, 80 are pivotally attached to the second arm tube 68 by means of a horizontally disposed pivot pin 82 that extends through holes 84 made through the pivot plate 78, 80 and through holes 86 made through the second arm tube 68. A set pin 87 is engageable through a selected pair among a plurality of pairs of holes 88 made through the pivot plates 78, 80 and through holes 90 made through the second arm tube 68. By selecting one pair among the pairs of holes 88 in the pivot plates 78, 80, the angular position of post 76 may be adjusted, as shown in FIG. 5.

In this example, the holder 16 comprises a first portion 51 and a second portion 53 movable relative to the first portion 51 of the holder 16 to adjust a length $L_H$ of the holder 16. For instance, in this embodiment, the length $L_H$ is a length of the post 76, the post 76 comprises the first portion 51 and the second portion 53 that is telescopically movable relative to the first portion 51 of the post 76 to adjust the length $L_H$ of the post 76. More particularly, the second portion 53 of the holder 16 is telescopically movable relative to the first portion 51 of the holder 16 to adjust the length of the holder 16.

More particularly, in this example, the post 76 may comprise an upper post tube 92 to which the pivot plates 78, 80 are affixed, and a lower post tube 94 that snugly fits within the upper post tube 92 so as to slide within the upper post tube 92 in a telescopic fashion. In this example, a set pin 96 extends through holes 98 made in upper post tube and a selected pair of holes among several pairs of holes 100 made in lower post tube 94 to allow adjusting the relative position of upper and lower post tubes 92, 94 and, hence, the length of post 76, as shown in FIGS. 3A and 3B.

In this embodiment, the lower post tube 94 carries a support plate 102 that is fixed to and that extends perpendicularly away from the lower post tube 94 at its lower extremity. More specifically, the support plate 102 is carried by a transverse tube 104 that is affixed to and extends perpendicularly away from lower post tube 94.

More particularly, in this embodiment, a first one of the holding members 77 may comprise a brace 106 disposed in an upper half of the holder 16, and a second one of the holding members 77 may comprise a support 85 disposed in a lower half of the holder 16 and configured to engage a bottom of the golf bag 56. The support 85 comprises the support plate 102 extending transversally to the post 76. In some embodiments, also, the brace 106 is an upper brace carried on the upper post tube 92; and a third one of the holding members 77 comprises a lower brace 108 disposed in the lower half of the holder 16, on lower post tube 94 and above the support 85. Each of the upper brace 106 and the lower brace 108 may have any suitable form such as be concave (e.g., arcuate and/or angular in a concave manner) and comprise an open concave side facing away from the bicycle 30 (e.g., the braces 106, 108 may face away in a direction that is substantially parallel to an upper surface of the support plate 102).

Figure 23:
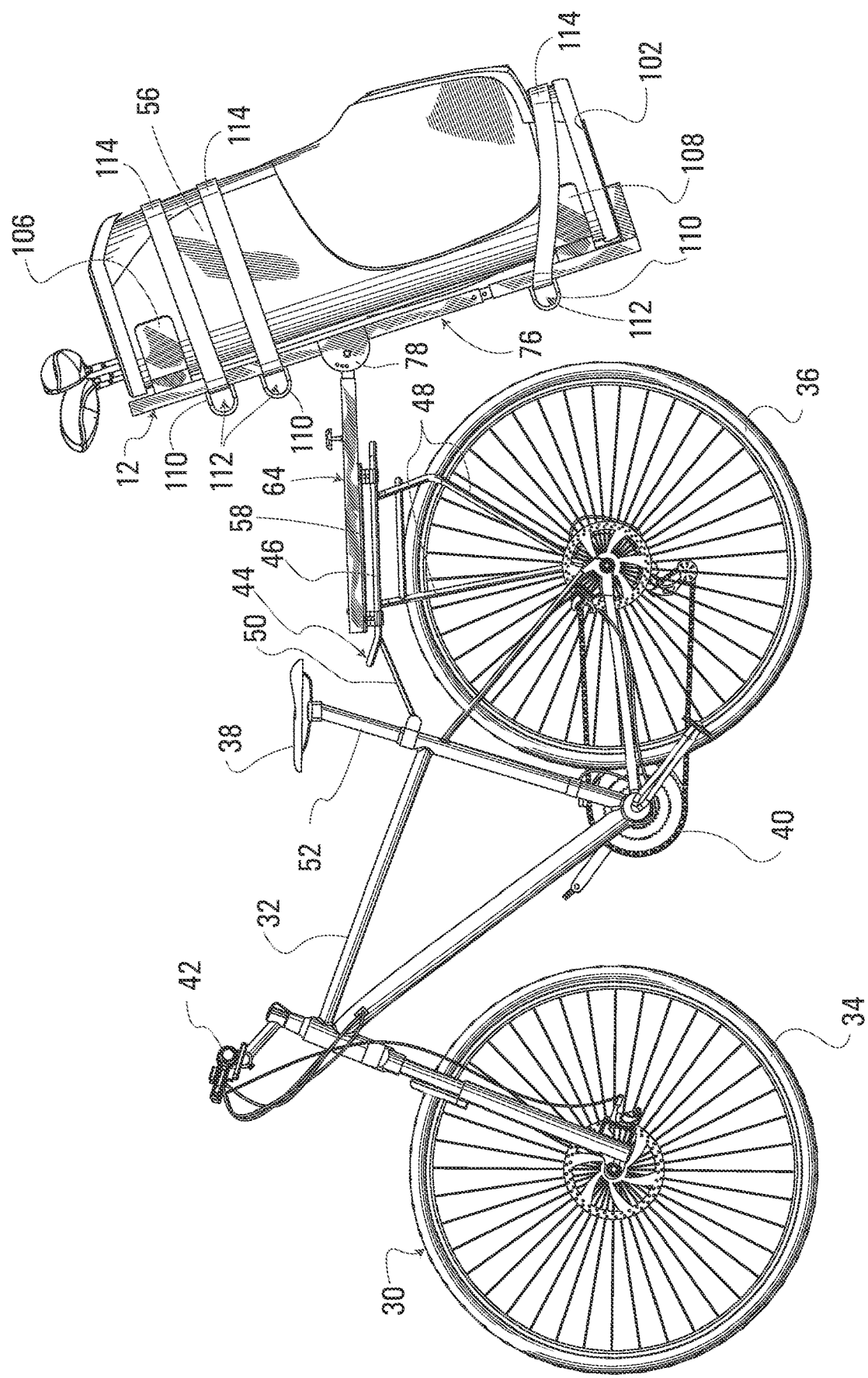
FIG. 23 shows a side elevation of the system, in which the golf-bag carrier comprises straps to secure the golf bag to the holder of the golf-bag carrier.
Figure 24:
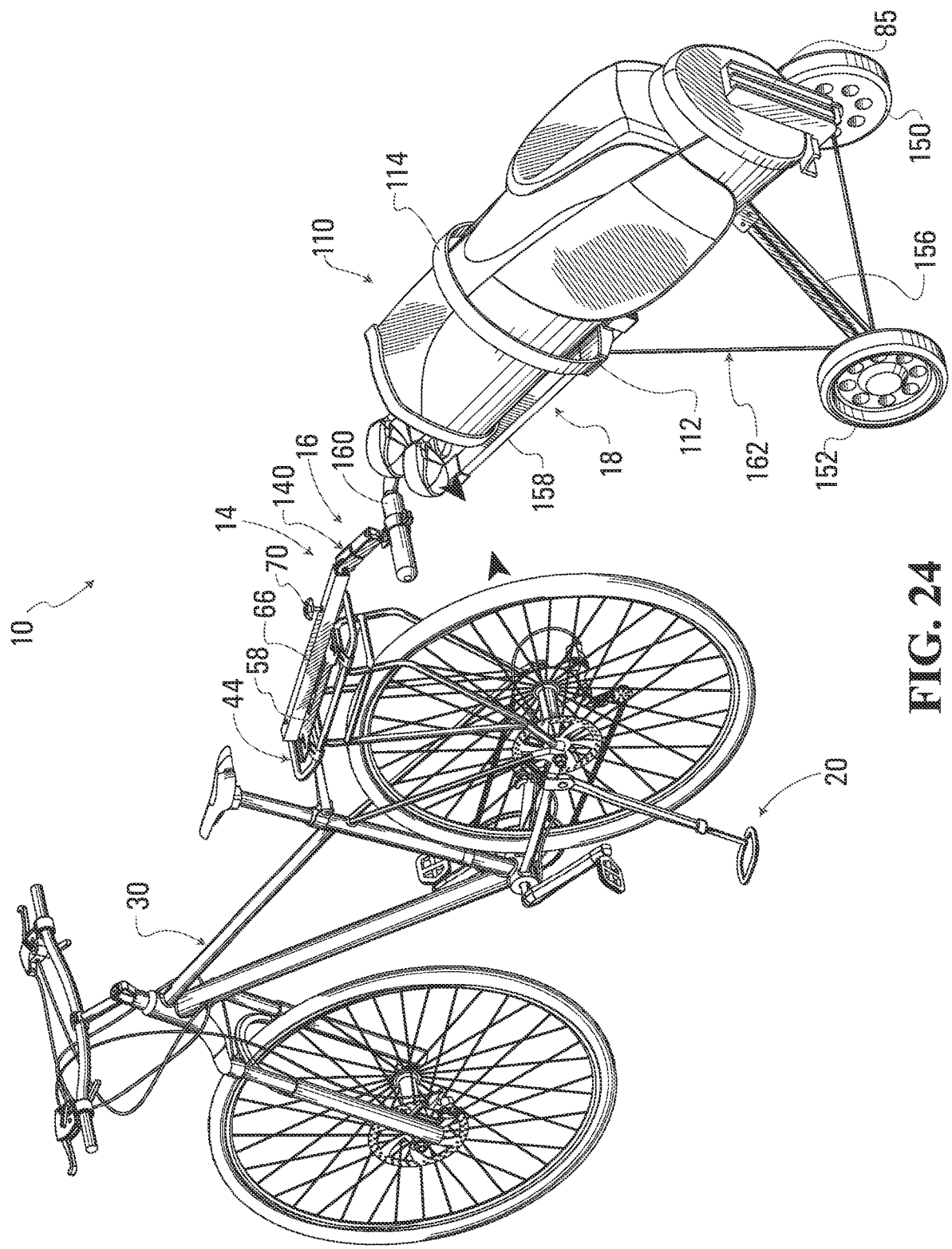
FIGS. 24 and 25 show perspective views of another embodiment of the system, herein the golf-bag carrier comprises a golf-bag cart.
Figure 25:
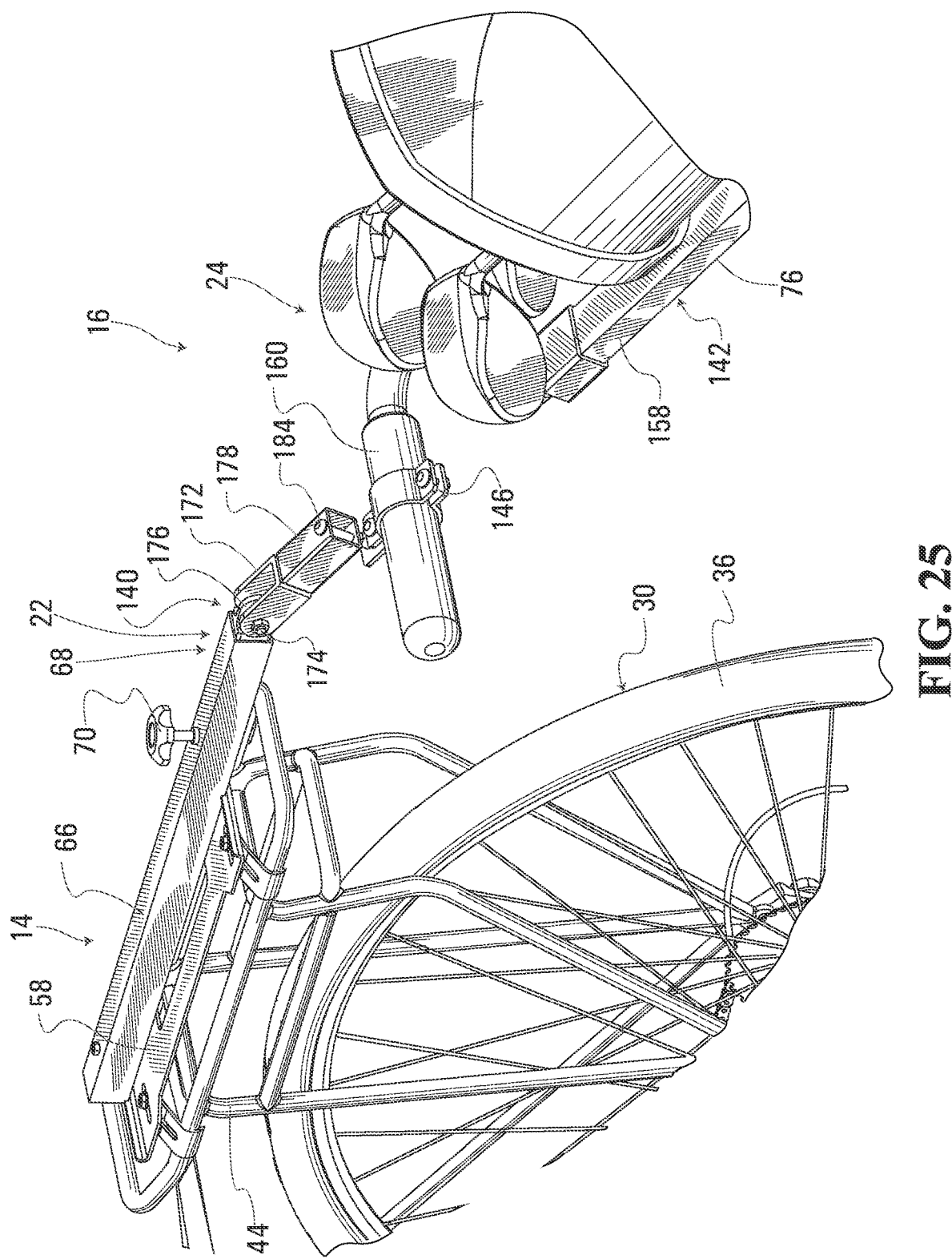
Figure 26:
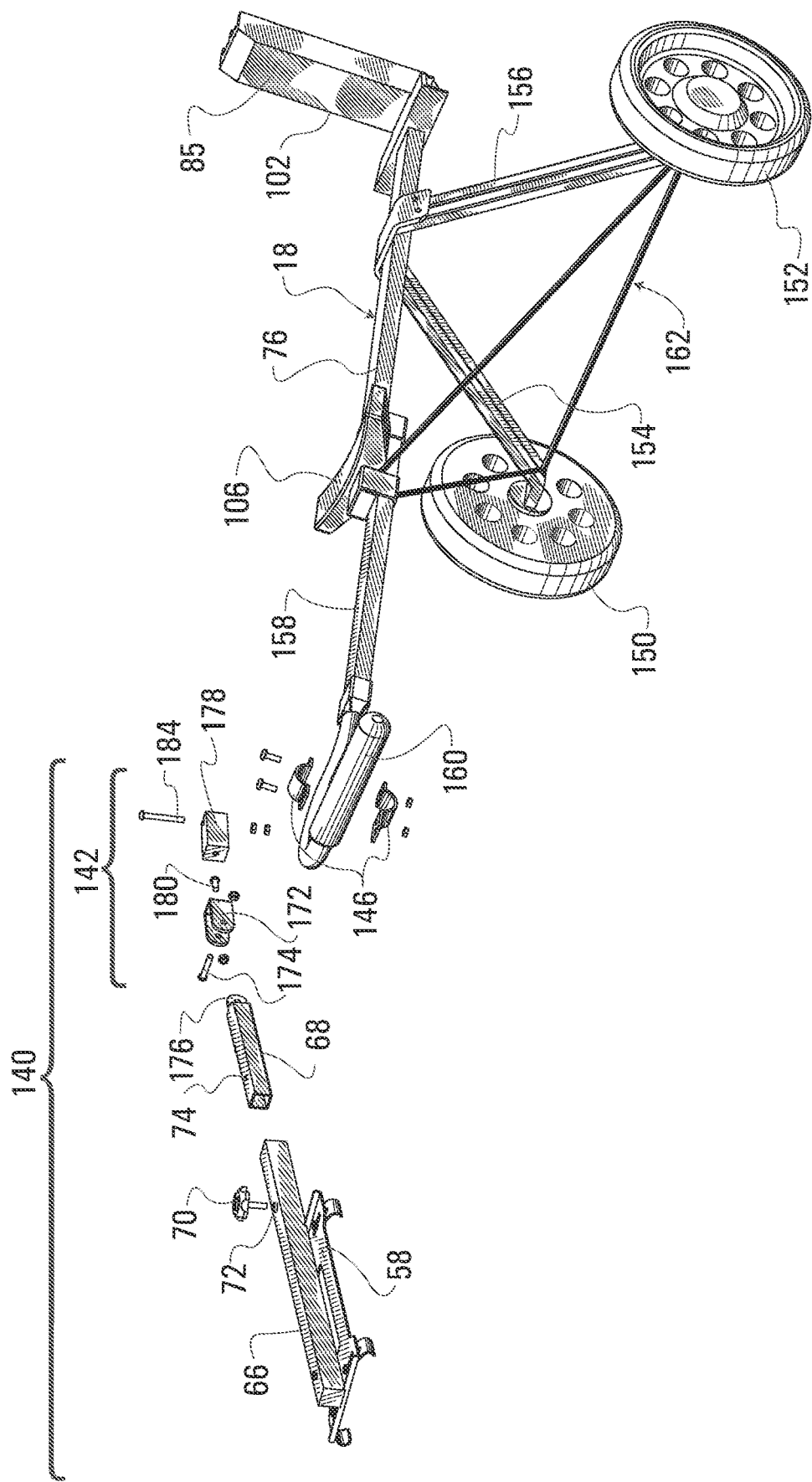
FIG. 26 shows a partially exploded view of the golf-bag carrier of FIGS. 23 and 24.

In this embodiment, the holder comprises 16 an attachment 110 (e.g., a strap ring) configured to attach the golf bag 56 to the holder 16 using a strap 114, as shown in FIG. 23. In this case, the attachment 110 may comprise an opening 112 configured to receive the strap 114 for attaching the golf bag 56 to the holder 16. In some embodiments, also, the strap 114 may be a first strap, the attachment 110 may be configured to attach the golf bag 56 to the holder 16 using the first strap 114 and a second strap 114, and the attachment 110 may comprise a first opening 112 configured to receive the first strap 114 and a second opening 112 configured to receive the second strap 114 for attaching the golf bag 56 to the holder 16.

In use, before or after installation of the golf-bag carrier 12 on the bicycle rack 44, it may be possible to adjust the length of the support arm 64 and of the length of the post 76 and the angular position of the post 76 relative to the support arm 64, e.g., to allow the golf-bag carrier 12 to be installed on bicycles of different sizes and configurations, and/or to adjust the linear position and/or the angle of the golf bag 54 so as to consequently adjust a position of a center of mass of a combination of the golf-bag carrier 12 and the golf bag 56 relative to the bicycle 30. For instance, the user may advantageously position the center of mass low and close to the user while the user is using the bicycle 30 to increase the stability of the bicycle 30 with the golf-bag carrier 12 and the golf bag 56.

In this embodiment, the holder 16 is adjustable relative to the base 14 to move the center of mass of the combination of the golf-bag carrier 12 and the golf bag 56 forwardly (i.e., towards a front of the bicycle) and/or towards the user riding the bicycle 30. In particular, in this embodiment, the holder 16 is adjustable relative to the base 14 to locate the center of mass of the combination of the golf-bag carrier 12 and the golf bag 56 between an axis of rotation 65 of the rear wheel 36 and a front 33 of the bicycle 30, such that the center of mass is not located rearward of the axis of rotation 65 of the rear wheel 36 (i.e., past the axis of rotation 65 of the rear wheel 36 towards the rear of the bicycle 30). For instance, in some cases, the center of mass of the combination of the golf-bag carrier 12 and the golf bag 56 is located frontward of the axis of rotation 65 of the rear wheel 36 (i.e., past the axis of rotation 65 of the rear wheel 36 towards the front of the bicycle 30). More specifically, in this example, the holder 16 is adjustable relative to the base 14 such that the center of mass of the combination of the golf-bag carrier 12 and the golf bag 56 is located within a span of the rear wheel 36 in the longitudinal direction of the bicycle 30. The holder 16 is adjustable relative to the base 14 such that the center of mass of the combination of the golf-bag carrier 12 and the golf bag 56 is located within a distance from the axis of rotation 65 of the rear wheel 36 in the longitudinal direction of the bicycle 30 that is no more than half of a radius of the rear wheel 36.

Figure 7:
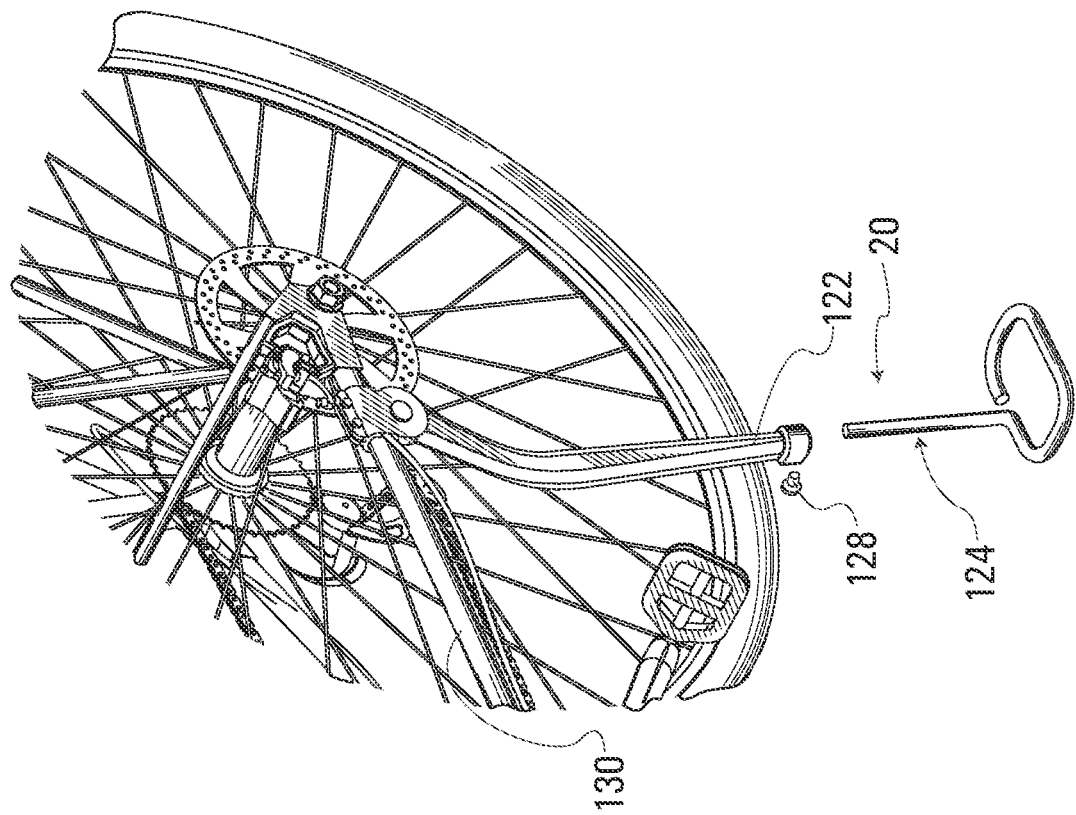
FIG. 7 shows an exploded perspective view of the bicycle kickstand.
Figure 6:
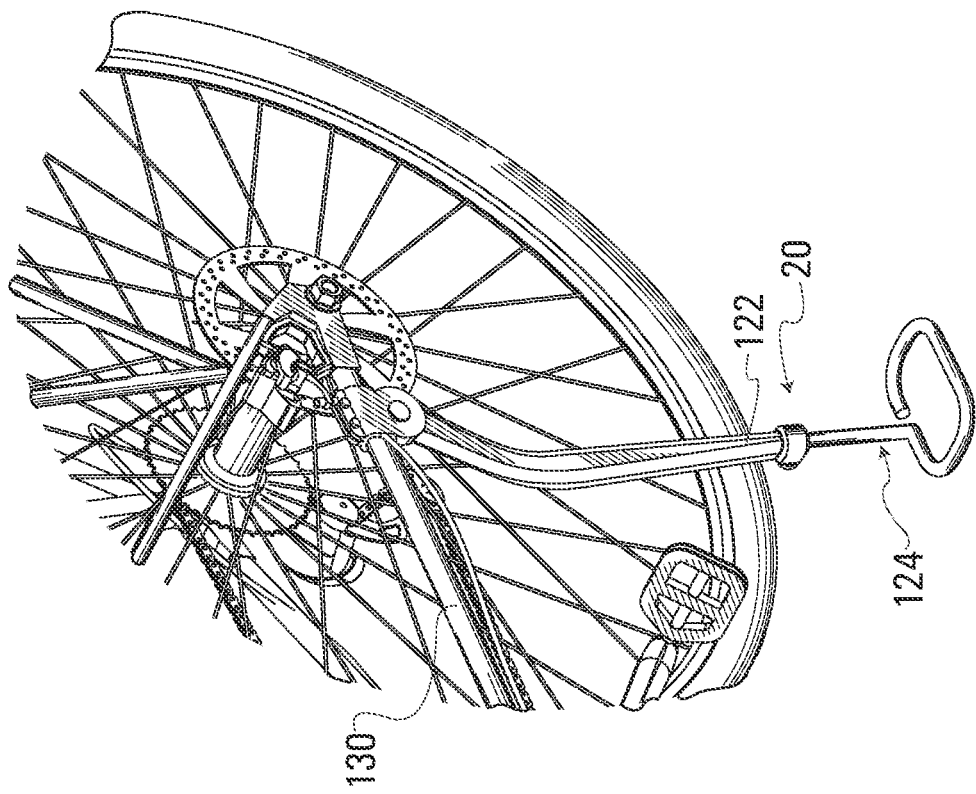
FIG. 6 shows an enlarged perspective view of a bicycle kickstand of the system, in which the bicycle kickstand includes a leg and a foot.
Figure 15:
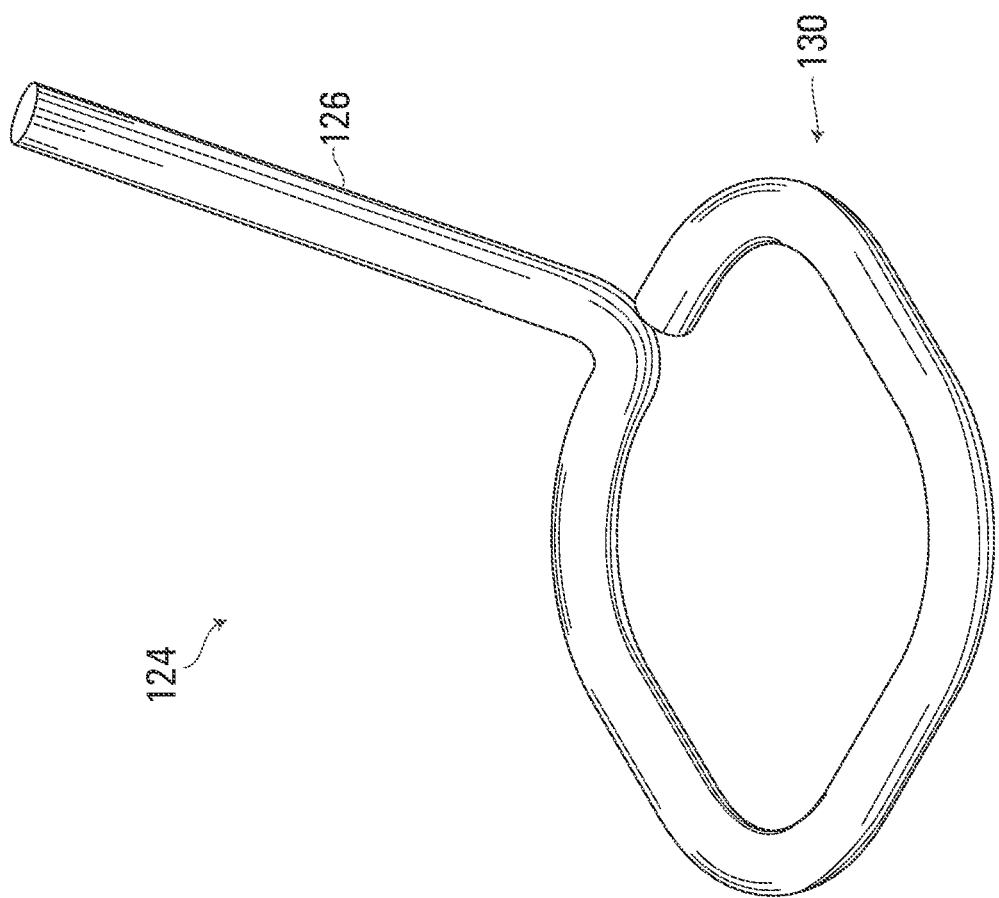
FIGS. 15 to 21 show respectively a top perspective view, a top plan view, a left side elevational view, a front elevational view, a right side elevational view, a rear elevational view and a bottom plan view of a variant of the foot of the bicycle kickstand.
Figure 16:
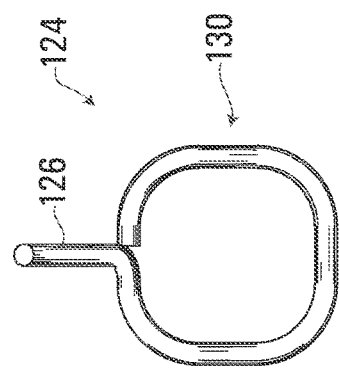
Figure 19:
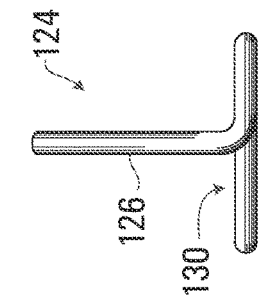
Figure 18:
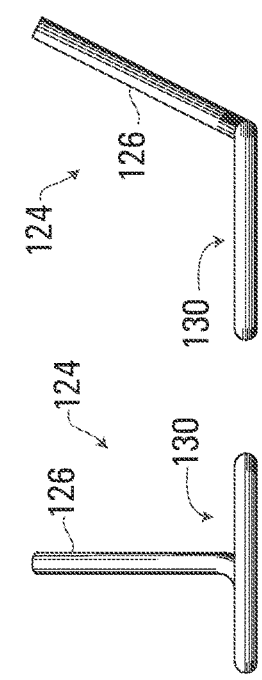
Figure 20:
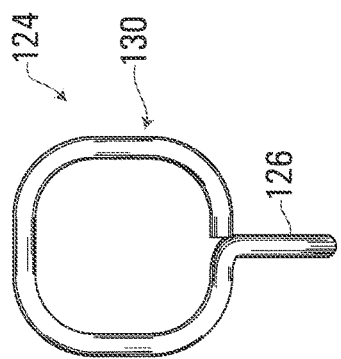
Figure 21:
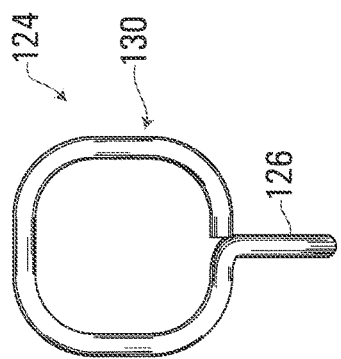
Figure 17:
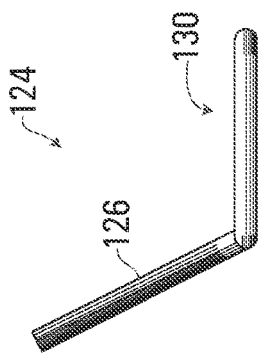

With additional reference to FIGS. 6 and 7, the bicycle kickstand 20 is for maintaining the bicycle 30 upright on the ground surface. The bicycle kickstand 20 comprises a leg 122 configured to be connected to the bicycle 30 and a foot 124 that is connected to the leg 122 and comprises a ground-engaging portion 130 to contact the ground surface.

In this example, the foot 124 is configured to contact the ground surface and dimensioned such that a span of an area of contact of the bicycle kickstand 20 with the ground surface is at least three times, in some embodiments at least five times, in some embodiments at least eight times, in some embodiments at least ten times, and in some embodiments an even greater number of times (e.g., at least 15 times) a dimension of a cross-section of the leg 122 normal to a longitudinal axis of the leg 122. The foot 124 may have any suitable shape and the ground-engaging portion 130 may have, for instance, a rectangular (e.g., elongated rectangular, square) shape, as shown in FIGS. 8 to 21 or any other suitable configuration.

The foot 124 may be movable (e.g., telescopically movable) relative to the leg 122 to adjust a position of the foot 124 relative to the leg 122, and may snugly fit within the leg 122. The foot 124 may also be removable from the leg 122. In this embodiment, the area of contact of the bicycle kickstand 20 with the ground surface may be larger than an area of contact of an end of the leg 122 with the ground surface when the foot 124 is removed from the leg 122. The kickstand 20 may comprise a set screw 128 to set a relative position of the foot 124 relative to the leg 122.

In some embodiments, the leg 122 is a conventional part of a bicycle kickstand, and in some embodiments, the leg 122 is custom made. In some cases, the bicycle 30 may be initially provided with an initial bicycle kickstand and the bicycle kickstand 20 may be configured to replace the initial bicycle kickstand. In this example, the area of contact of the bicycle kickstand 20 with the ground surface may be greater than an area of contact of the initial bicycle kickstand with the ground surface. The leg 122 may be pivotally affixed to the frame's chain stay 61.

In this embodiment, the foot 124 is configured to prevent sinking of the bicycle kickstand 20 into the ground surface when the bicycle 30 carries the golf bag 56. For instance, the foot 124 may comprise a stem 126 and the ground-engaging portion 130 forming a planar rest surface, and, when a gross weight of the bicycle is at least 23 kg, a pressure exerted by the bicycle kickstand 20 on the ground surface, without a user on the bicycle, may be no more than 15 kPa, in some embodiments no more than 12.5 kPa, in some embodiments no more than 10 kPa, in some embodiments no more than 7.5 kPa, and in some embodiments even less.

In this embodiment, the foot 124 may be formed of a single rod of rigid material such as metal. The extremity opposite stem 126 may be curved to form the ground-engaging portion 130 that allows a stable engagement of the kickstand 120 on the ground. More specifically, by spreading the area of the zone that rests on the ground, it is less likely that the bicycle will topple over, or that the stand will undesirably sink into soft ground, even if loaded with a heavy golf bag.

Alternate shapes could also be envisioned for the foot 124. For instance, in some embodiments, the ground-engaging portion 130 comprises a flat plate.

In other embodiments, as shown in FIGS. 24 to 30, the golf bag 56 may be mounted to a golf-bag cart 18 that comprises a plurality of cart wheels 150, 152 configured to roll on the ground surface. In this example, the golf-bag cart 18 is designed to be manually moved, i.e., pulled or pushed, by the user. In this embodiment, the golf-bag cart 18 is a golf-bag pull cart designed to be pulled by the user. In other embodiments, the golf-bag cart 18 may be a golf-bag push cart designed to be pushed by the user (e.g., and comprising one or more additional wheels). In other embodiments, the golf-bag cart 18 may be a push-pull cart designed to be either pushed or pulled by the user.

In this example of implementation, the golf-bag cart 18 may be of a conventional type. The golf-bag cart 18 may comprise wheel arms 154, 156 attaching the cart wheels 150, 152 to a post 136. The golf-bag cart 18 may comprise a handle arm 158 and a handle 160 provided at the handle arm's free extremity. In some embodiments, the golf-bag cart 18 may be selectively deployable in an operative, deployed condition, or collapsible into a folded storage position, in which the wheel arms 154, 156 and the handle arm 158 are folded towards the post 136. In this embodiment, the golf-bag cart 18 comprises a collapsing and deployment mechanism 162 to allow the wheel arms 154, 156 and the handle arm 158 to pivot together such that by pivoting the handle arm 158 only, the wheel arms 154, 156 are also pivoted to easily change the condition of the golf-bag cart 18 between its deployed or storage conditions. During use with the system 10, the golf-bag cart 18 may be in its operative deployed condition. The golf-bag cart 18 may be implemented in any other suitable way in other embodiments.

In this embodiment, the holder 16 comprises a hitch 140 connectable to the golf-bag cart 18 to pull the golf-bag cart 18 behind the bicycle 30. In this example, the hitch 140 is configured to allow the golf-bag cart 18 to move relative to the bicycle 30 while the golf-bag cart 18 is pulled by the bicycle 30. In particular, the hitch 140 may be configured to allow the golf-bag cart 18 to pivot relative to the bicycle 30 about at least one axis of rotation while the golf-bag cart 18 is pulled by the bicycle 30. More specifically, in this example, the hitch 140 is configured to allow the golf-bag cart 18 to pivot relative to the bicycle 30 about three orthogonal axes of rotation R1, R2, R3 while the golf-bag cart 18 is pulled by the bicycle 30. In particular, the hitch 140 is configured to allow pitch, roll, and yaw of the golf-bag cart 18 relative to the bicycle 30 while the golf-bag cart 18 is pulled by the bicycle 30.

For instance, in this embodiment, the hitch 140 comprises a universal joint 142 connectable to the golf-bag cart 18. Also, the hitch 140 comprises a handle-engaging connector 144 connectable to the handle 160 of the golf-bag cart 18. In this example, the handle-engaging connector 144 may comprise a clamp 146 configured to damp the handle 160 of the golf-bag cart 18. The universal joint 142 may connect the second arm tube 68 to the connector 144 and may allow pivotal displacement of the connector 144 and the pull cart handle 160 relative to the second arm tube 68 in all three orthogonal axes R1, R2, R3. More specifically, the universal joint 142 may comprise a U-shaped bracket 172 pivotally attached with a first pivot pin 174 to a pivot plate 176 that is fixed to the extremity of the second arm tube 68 that protrudes outside of first arm tube 66. The universal joint 142 may also comprise a joint tube 178 that is pivotally attached at a first end thereof to a bracket 172 with a second pivot pin 180, and that is pivotally attached at a second end thereof to the connector 144 comprising the clamp 146 with a third pivot pin 184. The clamp 146 may be fixedly attached to the handle 160 of the golf-bag cart 18.

Figure 27:
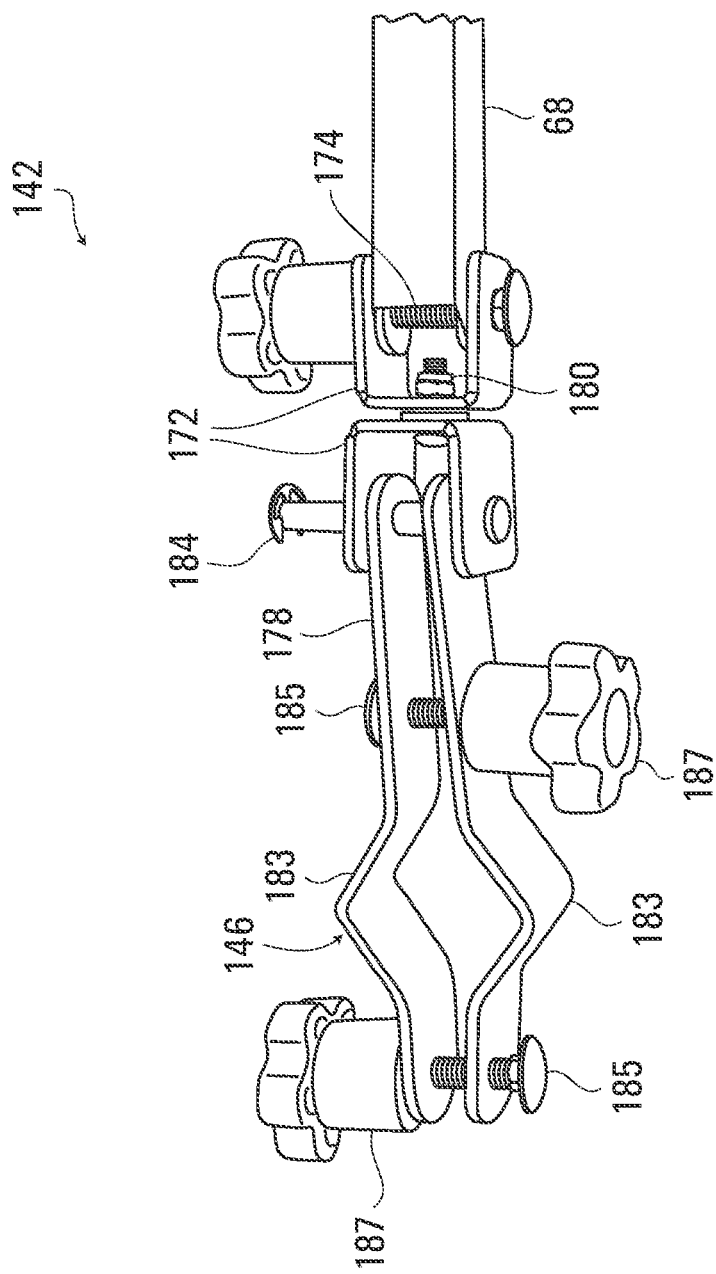
FIG. 27 shows a variant of a universal joint of the golf-bag carrier.
Figure 28:
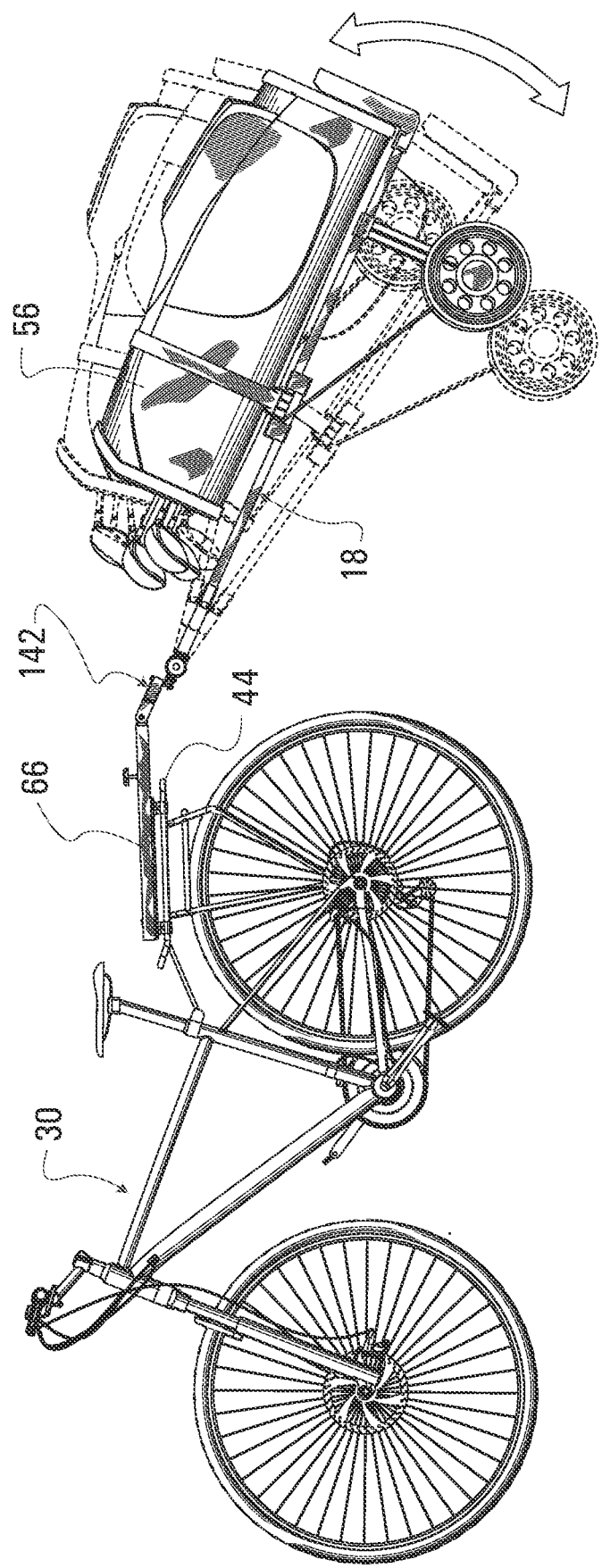
FIGS. 28 to 30 show respectively a side elevation, a top plan view and a rear elevation of the system and show in dotted lines alternate angular positions of the movable portion of the golf-bag carrier relative to the fixed portion of the golf-bag carrier that are allowed by a hitch thereof.
Figure 29:
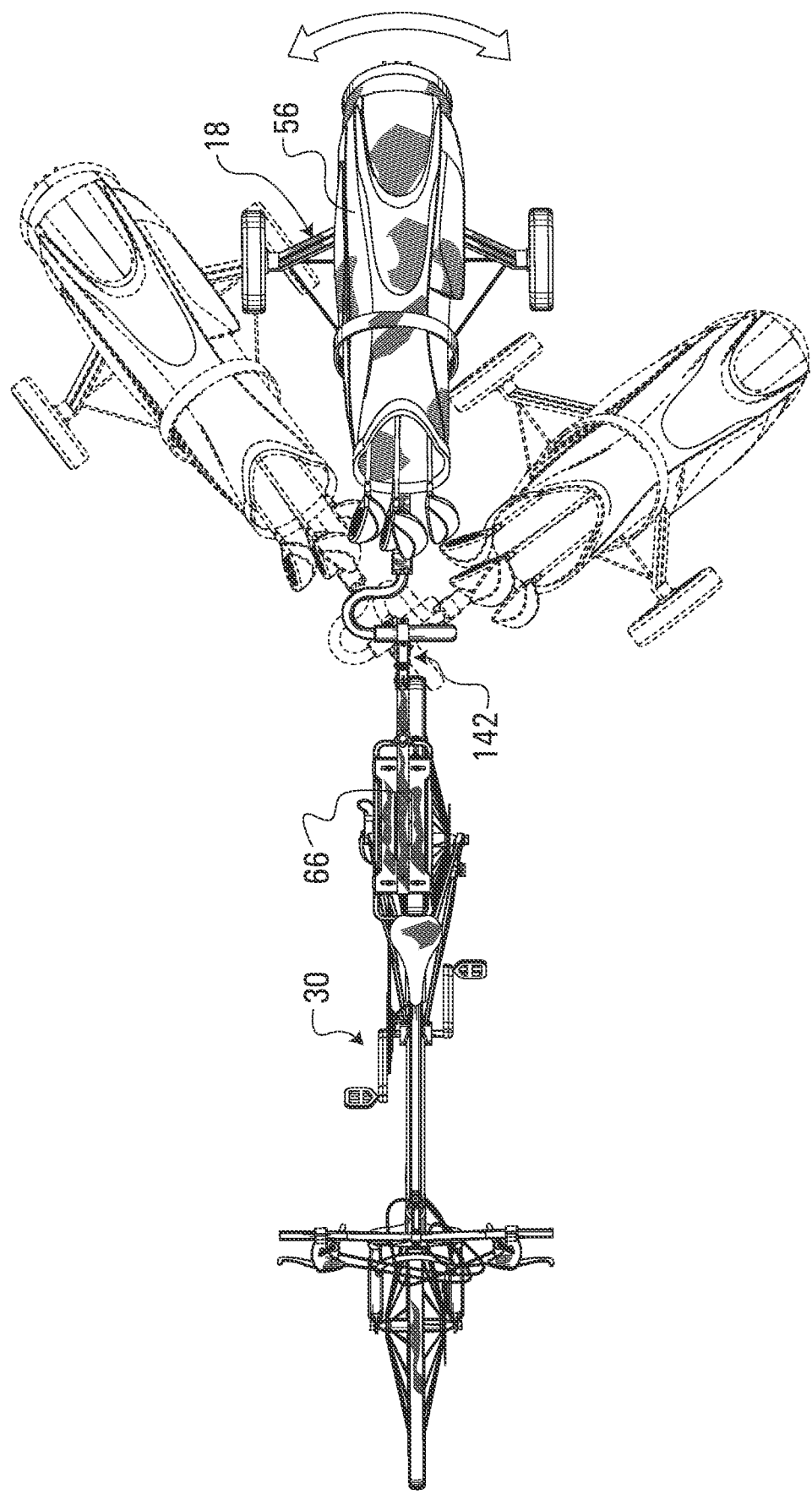
Figure 30:
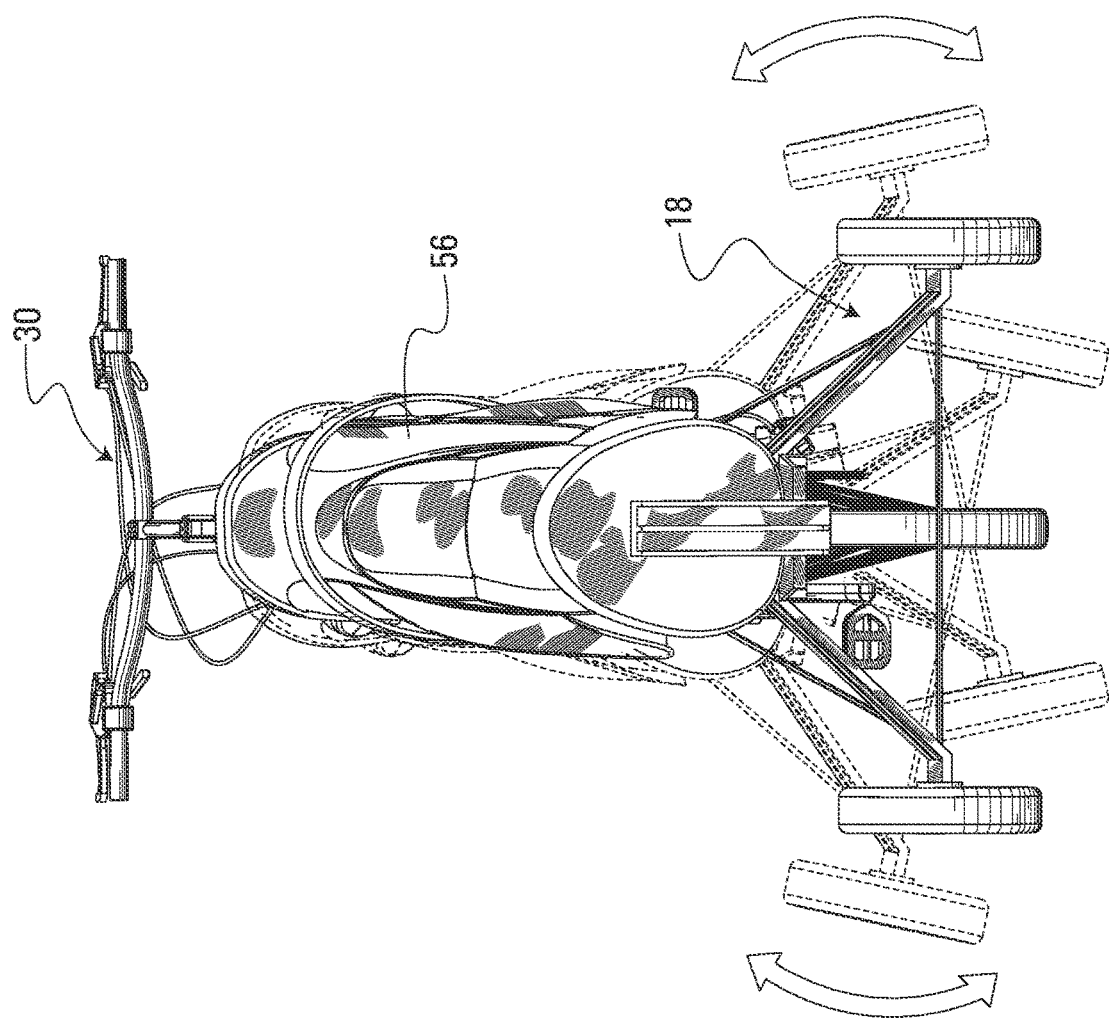

In other embodiments, as shown in FIG. 27, the universal joint 142 may comprise two U-shaped brackets 172. A first one of the U-shaped brackets 172 may be pivotally attached with the first pivot pin 174 to the extremity of the second arm tube 68 that protrudes outside of first arm tube 66. The U-shaped brackets 172 may be adjacent to one another in a back-to-back fashion and may be pivotally connected to one-another by the second pivot pin 180 connected to a central wall of each of the U-shaped brackets 172. A second one of the U-shaped brackets 172 may be pivotally attached with the third pivot pin 184 to the joint tube 178 of the connector 144, at the end of which the clamp 146 is disposed. In this embodiment, each of the pivot pins 174, 180, 184 may be of any suitable kind, e.g., may comprise a bolt and a nut. In this embodiment, the first pivot pin 174 comprises a bold and a handle, allowing the user to tighten or loosen the connection between the first U-shaped bracket 172 to the second arm tube 68 toollessly, and also allowing the user to lock a position of the first U-shaped bracket 172 relative to the second arm tube 68 toollessly. The clamp 146 may be any suitable type of clamp. For instance, in this embodiment, the clamp 146 comprises a pair of brackets 183 connected to one another by screws 185 which can be operated to tighten or loosen the brackets 183. In this embodiment, the damp 146 is operable by the user toollessly (i.e., without requiring any tool such as screwdrivers, keys, etc.) using threaded handles 187.

The first, second and third pivot pins 174, 180 and 184 may be orthogonally disposed with respect to each other so as to allow the golf-bag cart 18 to pivot about all three axes R1, R2, R3. This allows the golf-bag cart 18 to be pulled by the bicycle 30 and to adjust to irregular terrain, without mechanical stress being imposed on the bicycle 30, the rack 44 or the pull cart 18; and without making driving the bicycle harder for the user as it would be the case with a rigid connection between the pull cart and the bicycle.

The bicycle 30 and/or the system 10, including the golf-bag carrier 12 and/or the bicycle kickstand 20, may be implemented in various other ways in other embodiments.

Figure 31:
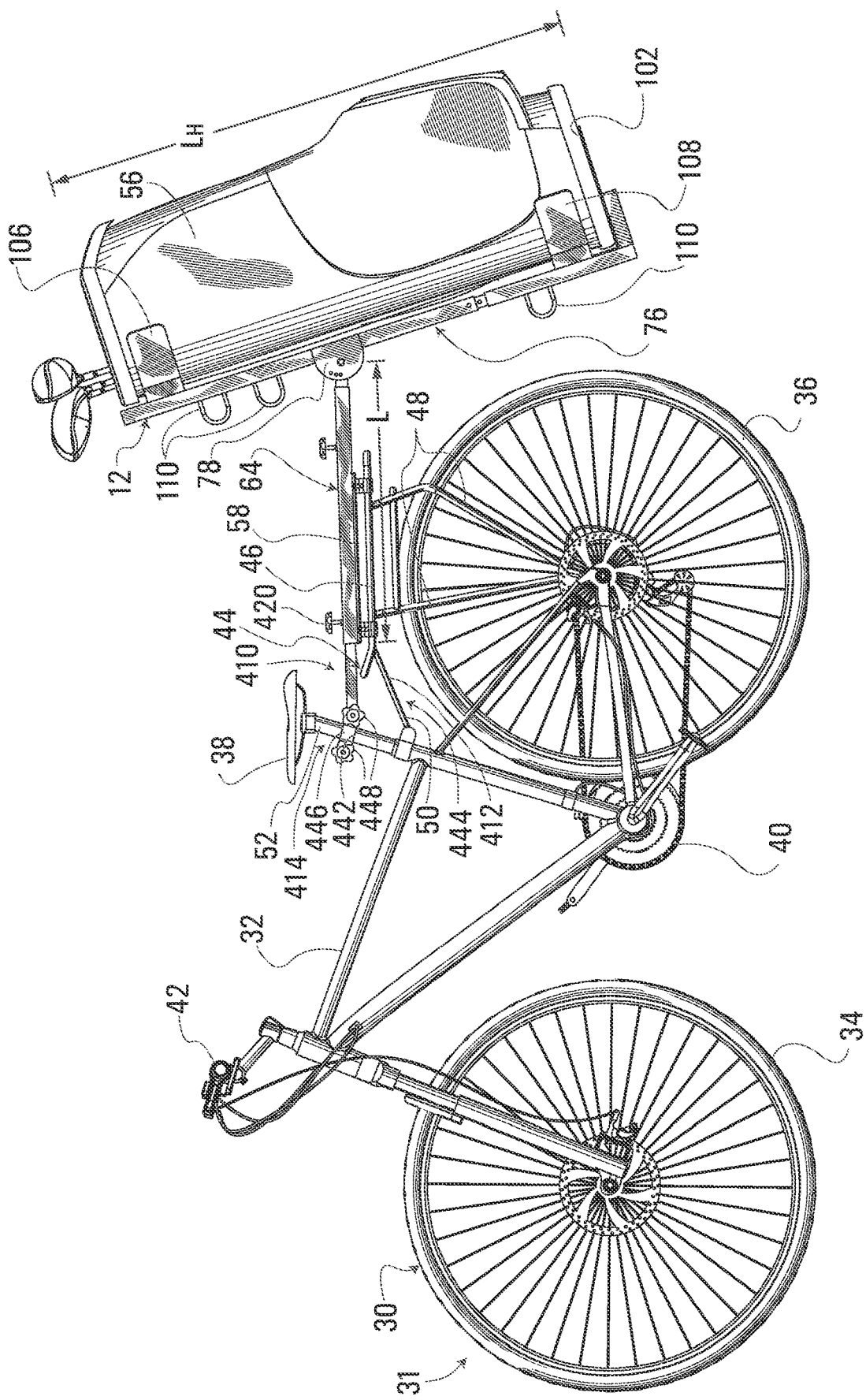
FIG. 31 shows another embodiment wherein the base of the golf-bag carrier comprises a movable member securable to a seat tube of the bicycle.
Figure 32:
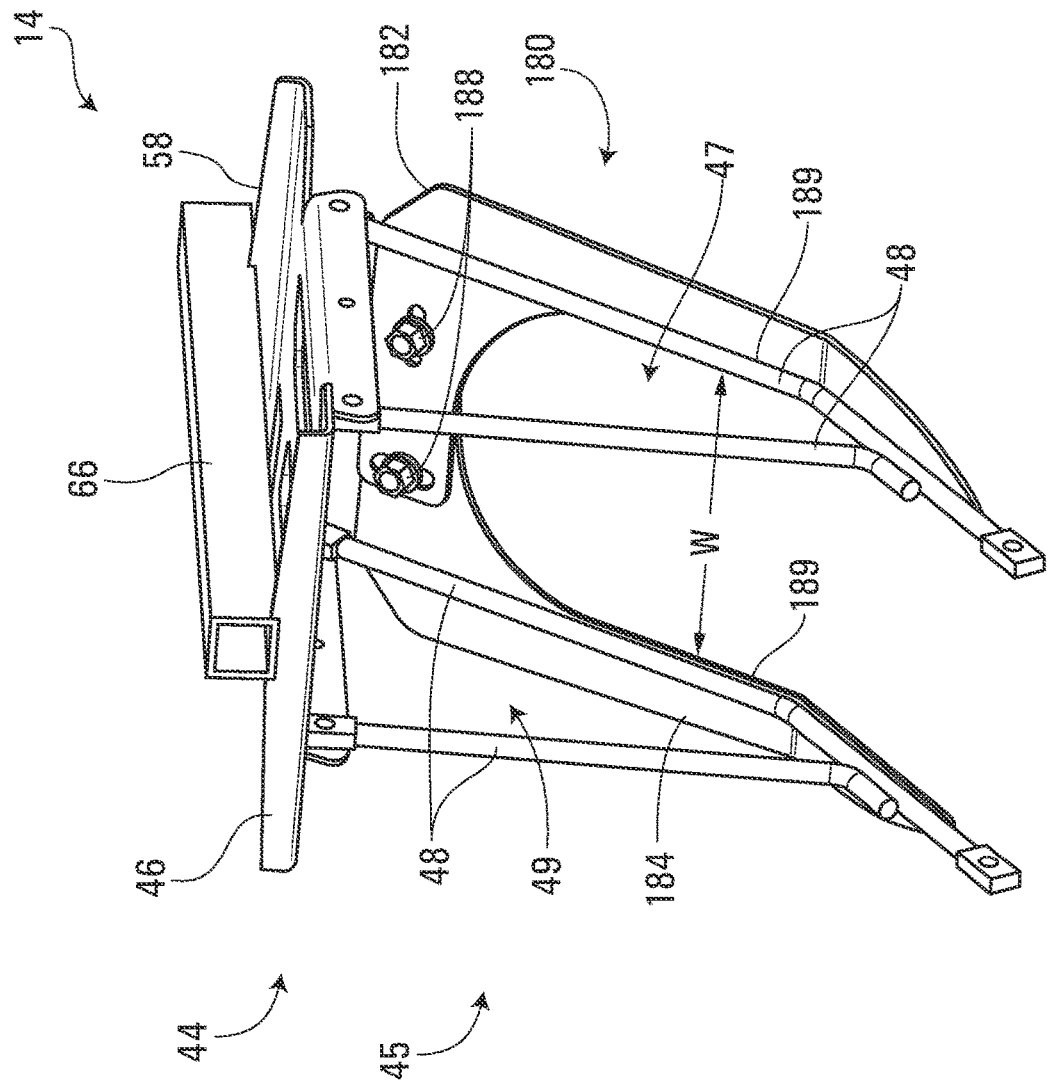
FIG. 32 shows a perspective view of a support structure comprising a reinforcement.
Figure 33:
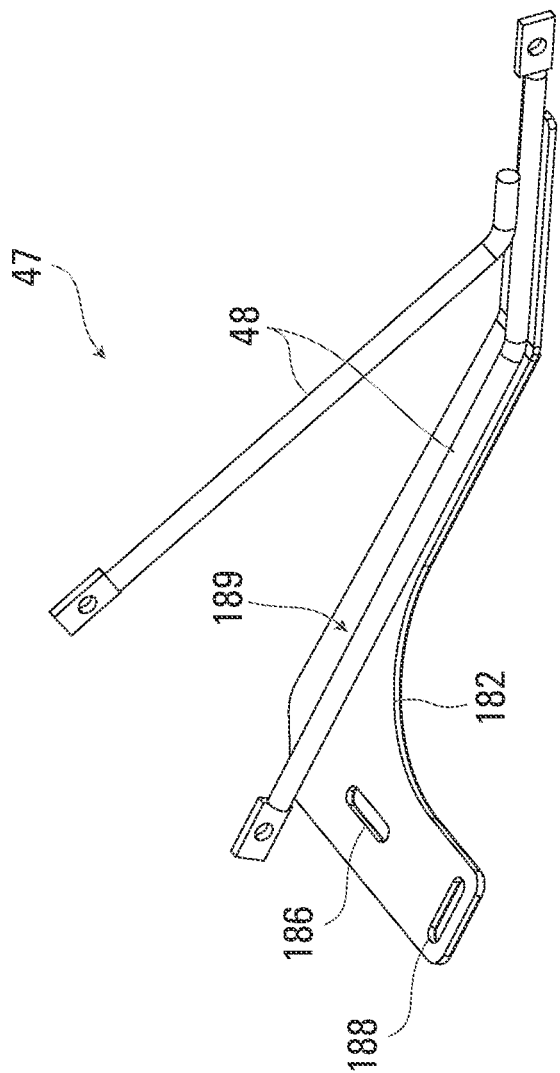
FIGS. 33 and 34 show perspective views of portions of the reinforcement.
Figure 34:
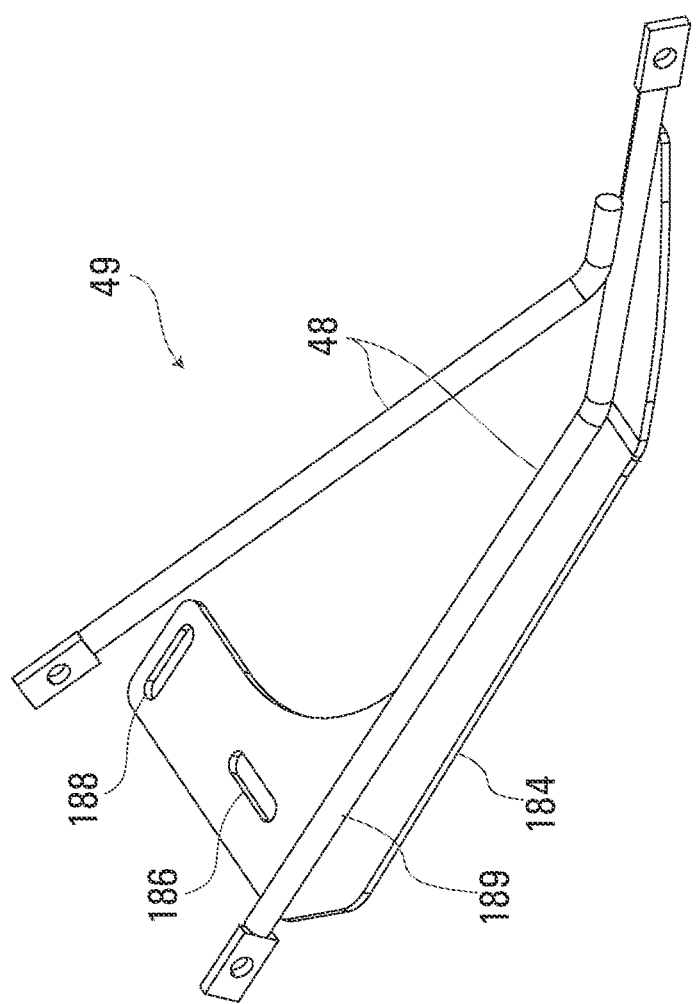

For example, in some embodiments, as shown in FIG. 31, the base 14 may be secured to the seat tube 52 to further stabilize the golf-bag carrier 12 and/or the golf bag 56 to the bicycle 30. For instance, the base 14 may comprise a movable member 410 securable to the seat tube 52 and adjustable relative to the fixed member 22 of the base 14, and the base 14 may comprise an adjustment mechanism 420 configured to adjust the movable member 410 of the base 14 relative to the fixed member 22 of the base 14. For instance, in some embodiments, the adjustment mechanism 420 may be similar to the linear adjustment mechanism 57 of the adjustment system 55 such that the movable member 410 may be translatable relative to the fixed member 22 of the base 14 in the longitudinal direction of the bicycle 30 in order to allow the movable member 410 of the base 14 to be secured to the seat tube 42. More specifically, the movable member 410 may be telescopically adjustable relative to the fixed member 22 of the base 14 in the longitudinal direction of the bicycle 30 in order to allow the base 14 to be secured to the seat tube 42. As such, the golf-bag carrier 12 is adjustable and can be installed on bicycles of different sizes.

In this embodiment, the movable member 410 of the base 14 comprises a tube 412 and a connector 414. The tube 412 may be telescopically adjustable relative to the fixed member 22 of the base 14. The tube 412 may comprise a rear end and a front end and may be connected to the fixed member 22 of the base 14 at its rear end via the adjustment mechanism 420 of the base 14. The connector 414 may be provided at the front end of the tube 412.

In this embodiment, the connector 414 may comprise a clamp 442 operable by a user configured to secure the connector 414 to the seat tube 52, and a pivot 444 configured to allow the clamp 442 to be rotatable relative to the tube 412 about an axis extending in the lateral direction of the bicycle 30. In some embodiments, also, the pivot 444 may be configured to allow the clip 442 to be rotatable relative to the tube 412 about two or three orthogonal axes.

The clamp 442 may be any suitable type of clamp. For instance, in this embodiment, the clamp 442 may be similar to the clamp 146 of the holder 16 and may comprise a pair of brackets connected to one another by screws which can be operated to tighten or loosen the brackets. In this embodiment, the clamp 442 is operable by the user toollessly (i.e., without requiring any tool such as screwdrivers, keys, etc.).

As another example, in some embodiments, the bicycle 30 may be without, i.e., free of, any rack such as the rack 44, in which case the base 14 of the golf-bag carrier 12 may comprise the support structure 45 that is configured to be connected to the stay 50.

As another example, in some embodiments, as shown in FIGS. 32 to 37, the support structure 45 of the base 14 may comprise a reinforcement 180 connected between the left support member 47 and the right support member 49 to oppose lateral movement of the left support member 47 and the right support member 49. For instance, the reinforcement may comprise a first portion 182 secured to the first support member 47 and a second portion 184 secured to the second support member 79 and the first portion 182 of the reinforcement 180, and the reinforcement may be configured to receive the rear wheel 36 between the first portion 182 of the reinforcement 180 and the second portion 184 of the reinforcement 180.

The reinforcement 180 may increase a stiffness of the support structure 45 of the base 14 significantly. For instance, in some embodiments, a ratio of a lateral bending stiffness of the base 14 with the reinforcement 180 over a lateral bending stiffness of the base 14 without the reinforcement 180 may be at least 120%, in some embodiments at least 140%, in some embodiments at least 160%, and in some embodiments even more (e.g., at least 180%). The lateral bending stiffness of the base 14 may be measured in any suitable fashion, such as by immobilizing the bicycle 30, applying a lateral force at a rear end of the rack 44, and observing the resulting lateral displacement of the rear end of the rack 44. The base 40 may have any suitable lateral bending stiffness. For instance, in response to a lateral bending force of 5 pounds applied on the rear end of the rack 44, the rear end of the rack 44 may have a lateral displacement that is no more than 0.3 inch, in some embodiments no more than 0.2 inch, in some embodiments no more than 0.1 inch, and in some embodiments even less (e.g., no more than 0.05 inch).

In this embodiment, the portions 182, 184 of the reinforcement 180 are adjustable relative to one another such as to conform to different types and different widths of bicycle wheel. For instance, in some embodiments, the portions 182, 184 of the reinforcement 180 may conform to wheels having a width W between 4.4 inches and 5.7 inches. In particular, in this embodiment, each of the portions 182 and 184 comprise an upper end, an elongate aperture 186 extending in a widthwise direction of the reinforcement 180 and proximate to the upper end, and an elongate aperture 184 extending in a heightwise direction of the reinforcement 180 and proximate to the upper end. The connector 180 may comprise two fasteners 188 (e.g., two sets of nuts and bolts) configured to hold the portions 182, 184 of the reinforcement 180 through the elongate apertures 186, 188 of the portions 182, 184. Thus, in this embodiment, each of the fasteners 188 is configured to pass through the elongate aperture 186 of a given one of the portions 182, 184, and through the elongate aperture 188 of the other one of the portions 182, 184, such that the elongate aperture 186 and the elongate aperture 188 are aligned, and such that the portions 182, 184 are translatable and pivotable relative to one another during installation to adjust their spacing to accommodate the wheel. Once set up, the fasteners 188 are tightened to lock the portions 182, 184 relative to one another for stiffening the support structure 45.

The reinforcement 180 may be connected to the support members 47, 49 in any suitable fashion. For instance, in some embodiments, the reinforcement 180 may be welded to rods 48 along welding lines 189. In some embodiments, the reinforcement 180 may be removably affixed to rods 48, e.g., using mechanical fasteners (e.g., clamp fasteners) including fasteners proximate to respective bottom ends of the portions 182, 184.

Figure 38:
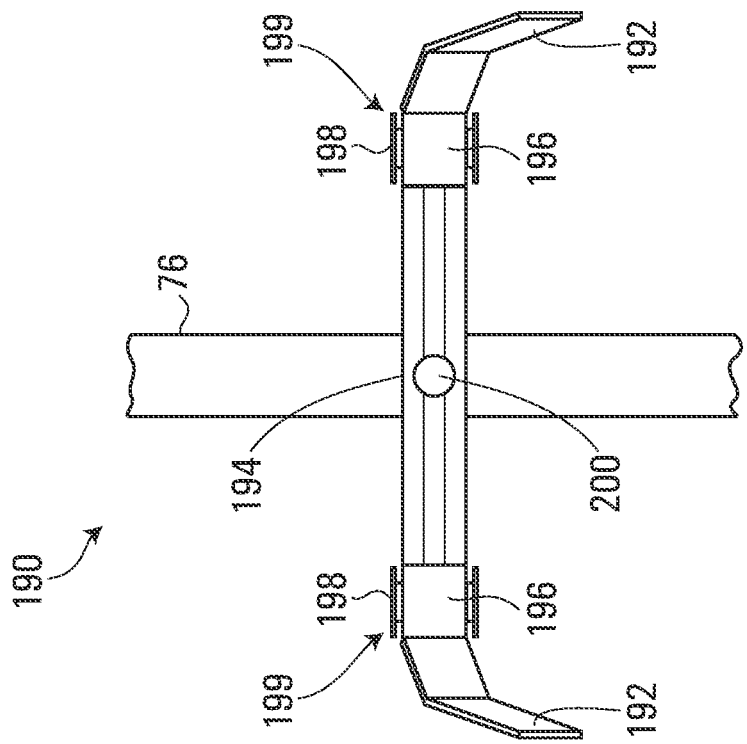
FIG. 38 shows another embodiment of the system wherein the golf-bag carrier comprises an adjustment mechanism to adjust a width and an angular position of a brace of the golf-bag carrier, the brace being in a reduced-width, or narrower, configuration.
Figure 39:
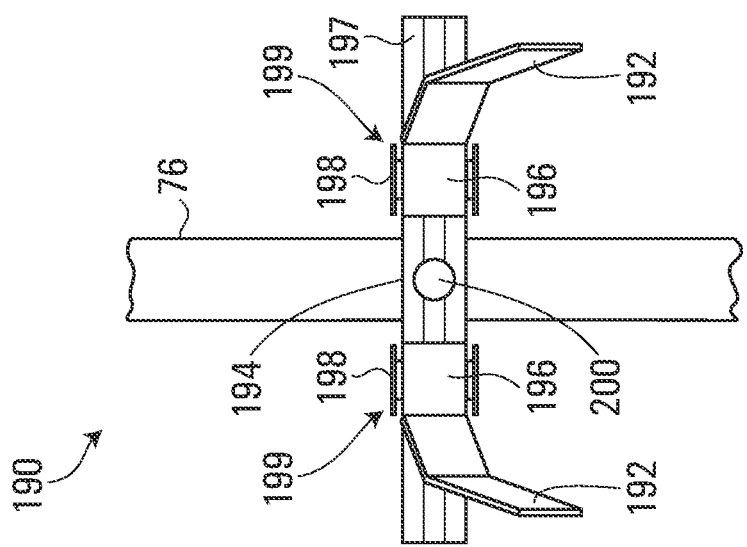
FIG. 39 shows the adjustment mechanism, the brace being in an increased-width or wider, configuration.

As another example, in some embodiments, as shown in FIGS. 38 and 39, the holder 16 may be configured to adjust a width of the holder 16, such as to at least reduce (i.e., reduce or eliminate) potential lateral movement of the golf bag 56 held by the holder 16 (e.g., as the bicycle 30 travels on the ground surface) and/or to accommodate different types (e.g., sizes, youth vs. adult, etc.) of golf bags like the golf bag 56.

For example, in some embodiments, the holder 16 may comprise a lateral adjustment mechanism 190 to adjust lateral holding parts of the holder 16 relative to one another for adjusting the width of the holder 16 by adjusting a spacing of the lateral holding parts 191 of the holder 16 in a widthwise direction of the golf-bag carrier 12. For instance, the lateral holding parts may comprise at least part of the braces 106, 108 and the lateral adjustment mechanism 190 may be configured to adjust the braces 106, 108 and the post 76 relative to one another.

In some embodiments, the braces 106, 108 may comprise a material and may have a geometry such that the braces 106, 108 are stiff enough to hold the golf bag 56, but flexible and malleable enough to allow the user to change a shape of the braces 106, 108 such that they hold the golf bag in a suitable fashion.

In some embodiments, each of the braces 106, 108 may comprise a central portion 194 and lateral holding portions 192 connected to the central portion 194 and comprising the lateral holding parts 191. The lateral holding parts of the holder 16 may comprise the lateral holding portions 192 of each of the braces 106, 108. The central part of the central portion 194 may comprise a toothed rail 197. Each of the lateral holding portions 192 may be affixable to the central portion 194 by a connector 196. In this example, each connector 196 is a spring-loaded lockable connector that is slidably engaged with the rail 197 of the central portion 194. In particular, each connector 196 may be shaped to be slidably engageable with the rail 197 and may comprise a user-engageable actuator 198 (e.g., a button) and a locking mechanism 199 (e.g., teeth) configured to engage the rail 197 and lock a relative position of the connector 196 on the rail 197 when the actuator 198 is at rest.

The lateral adjustment mechanism 190 may also comprise lockable pivots 200 connecting each brace 106, 108 to the post 76. The lockable pivots 200 may be of any suitable kind an may comprise, for instance, a toollessly (i.e., without requiring use of tools) user-engageable screw 200 connecting the central portion 194 to the post 76 such that when the screw 200 is loose, the brace is pivotable relative to the post 76, and when the screw 200 is tightened by the user, the brace is affixed (i.e., not pivotable) relative to the post 76.

Figure 40:
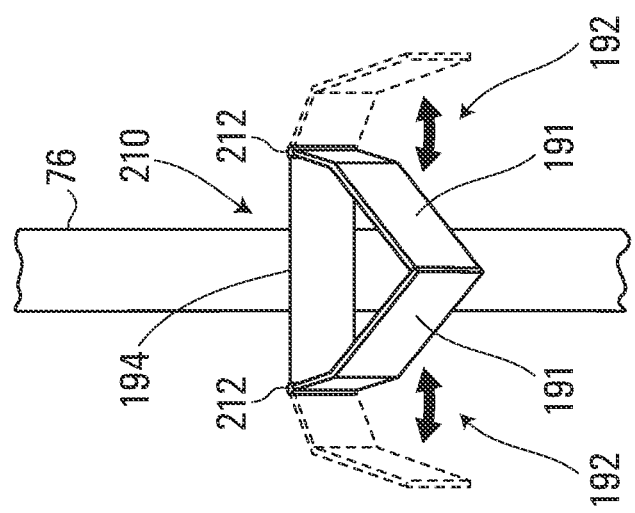
FIGS. 40 and 42 show other embodiments of the system wherein the golf-bag carrier comprises a connector to secure the golf bag to the holder of the golf-bag carrier.

As another example, in some embodiments, as shown in FIG. 40, the golf-bag carrier 12 may comprise a connector 210 dedicated to securing the golf bag 56 to the holder 16.

Figure 42:
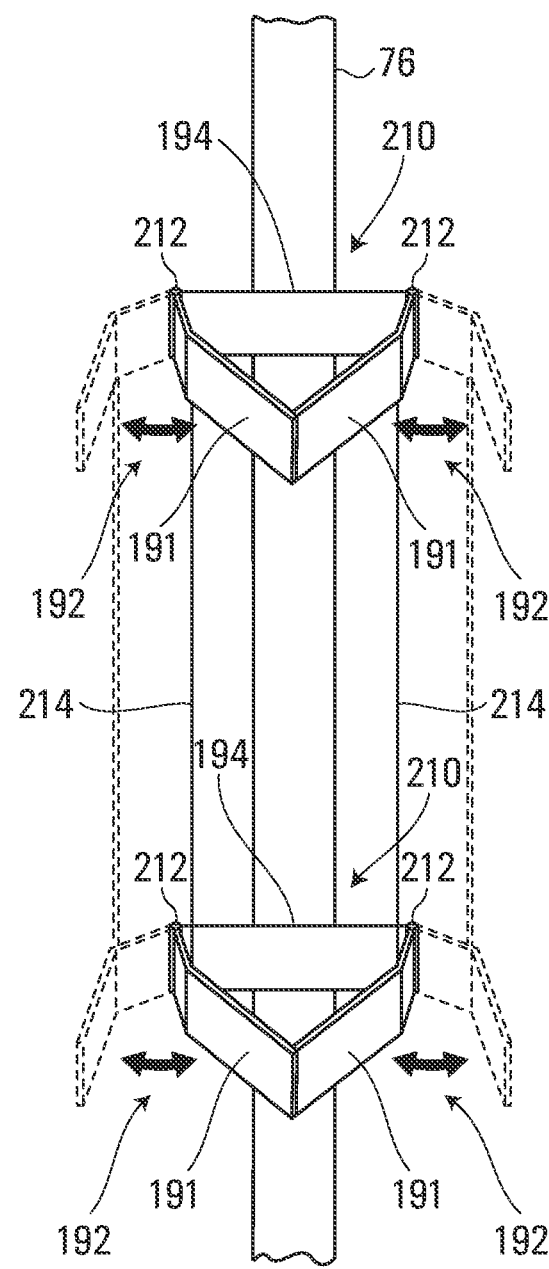

For instance, in this embodiment, the connector 210 may comprise spring-loaded hinges 212 connecting the lateral holding portions 192 to the central portion 194 of each of the braces 106, 108. The hinges 212 may be spring-loaded such that the spring load of the hinges 212 forces the lateral holding portions 192 to rotate inwards, forcing the lateral holding portions 192 to engage the golf bag 56 when the golf bag 56 is received on the carrier 12. The hinges 212 may have a spring rate that is sufficient to secure the golf bag 56, but that is not too high such that the user can open the lateral holding portions 192 (i.e., rotate the lateral holding portions 192 outwardly). In some embodiments, as shown in FIG. 42, the connector 210 may also comprise connecting rods 214 connecting respective ones of the spring-loaded hinges 212 to one another to synchronize an opening angle of respective hinges 212, such that the user can open each of the braces 106, 108 by engaging only one of them.

Figure 41:
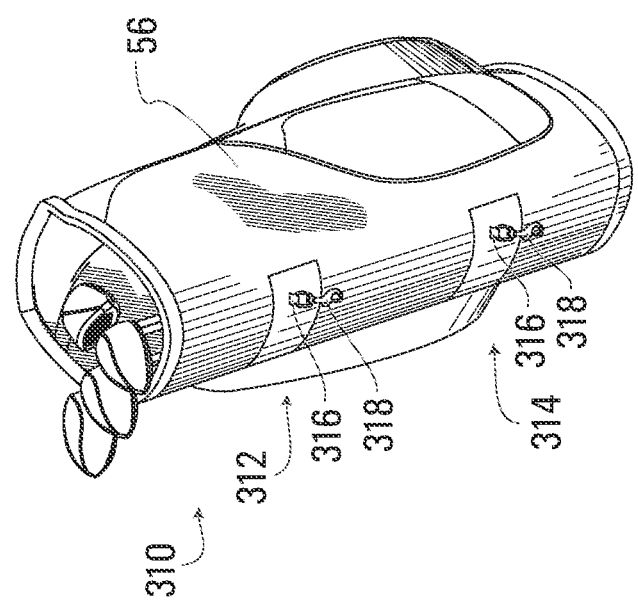
FIG. 41 shows another embodiment wherein the golf-bag comprises a connector to secure the golf bag to the holder of the golf-bag carrier.

As another example, in some embodiments, as shown in FIG. 41, the golf bag 56 may comprise a connector 310 dedicated to securing the golf bag 56 to the holder 16. For instance, in this embodiment, the connector 310 may comprise an upper connecting portion 312 to secure an upper portion of the golf bag 56 to the holder 16 and a lower connecting portion 314 to secure a lower portion of the golf bag 56 to the holder 16. Each of the portions 312 may comprise a strap 316 (e.g., an elastic strap, a non-elastic strap) having a first end and a second end opposite the first end, and being affixed to the golf bag 56 (e.g., by stitching) at the first end. In some embodiments, the strap 316 may be adjustable, e.g., by means of a hook-and-loop fastener provided at one end of the strap 316. The connector 310 may comprise carabiners 318 (e.g., spring-loaded carabiners, lockable carabiners, etc.) attached to the straps 316 at the second ends of the straps 316. The carabiners 318 may be configured to be attachable to and detachable from the holder 16. More particularly, in this example, the carabiners 318 are attachable to and detachable from the connectors 110 of the holder 16. While in some embodiments the golf bag 56 may be manufactured and sold with the connector 310, in some embodiments, the connector 310 may be sold or provided separately and may be affixable to the golf bag 56 by the user (e.g., by being stitched, glued, or otherwise fastened to the golf bag 56).

Figure 43:
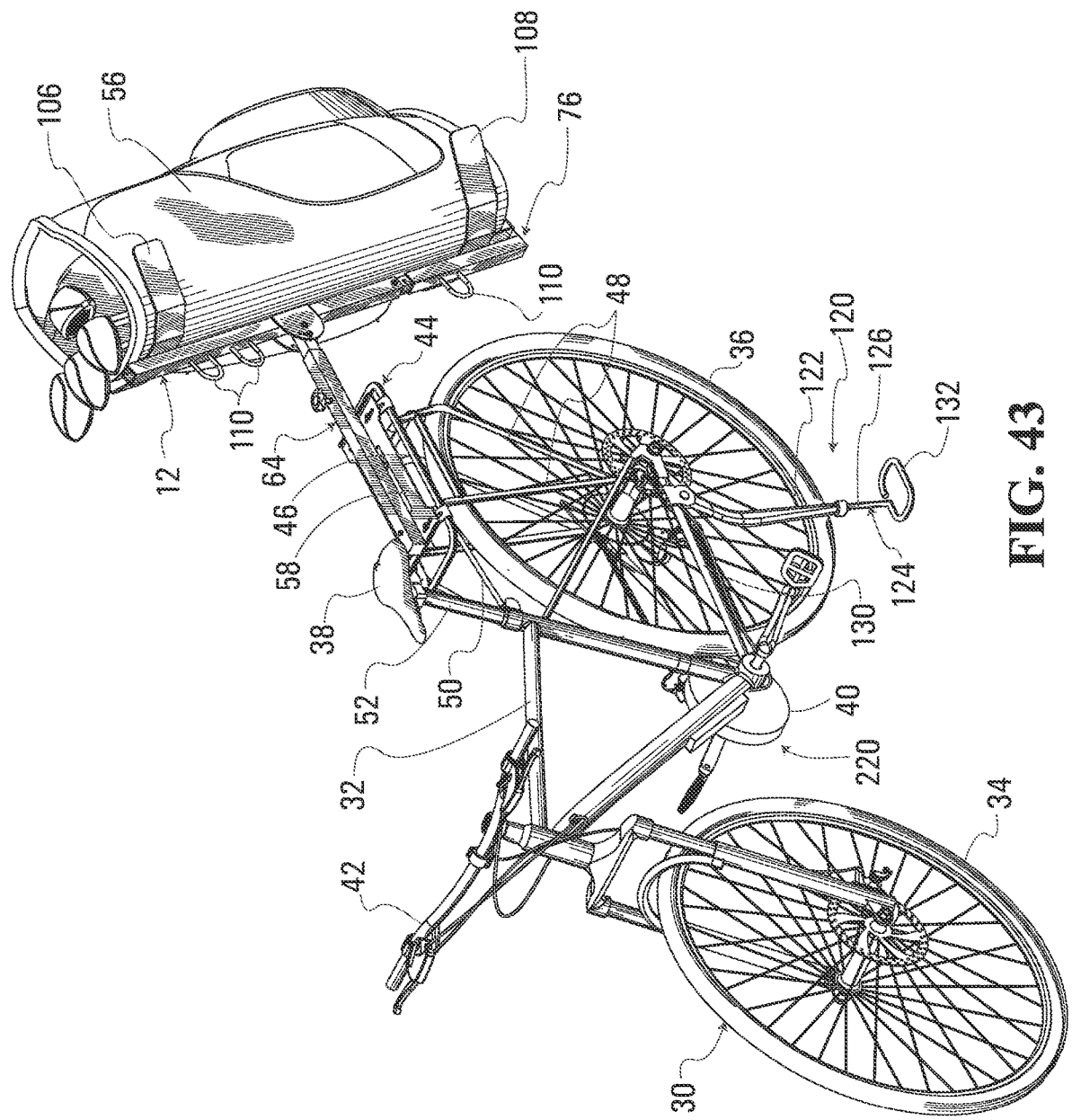
FIGS. 43 to 49 show other embodiments of the system, wherein the bicycle comprises an electric drive system.
Figure 44:
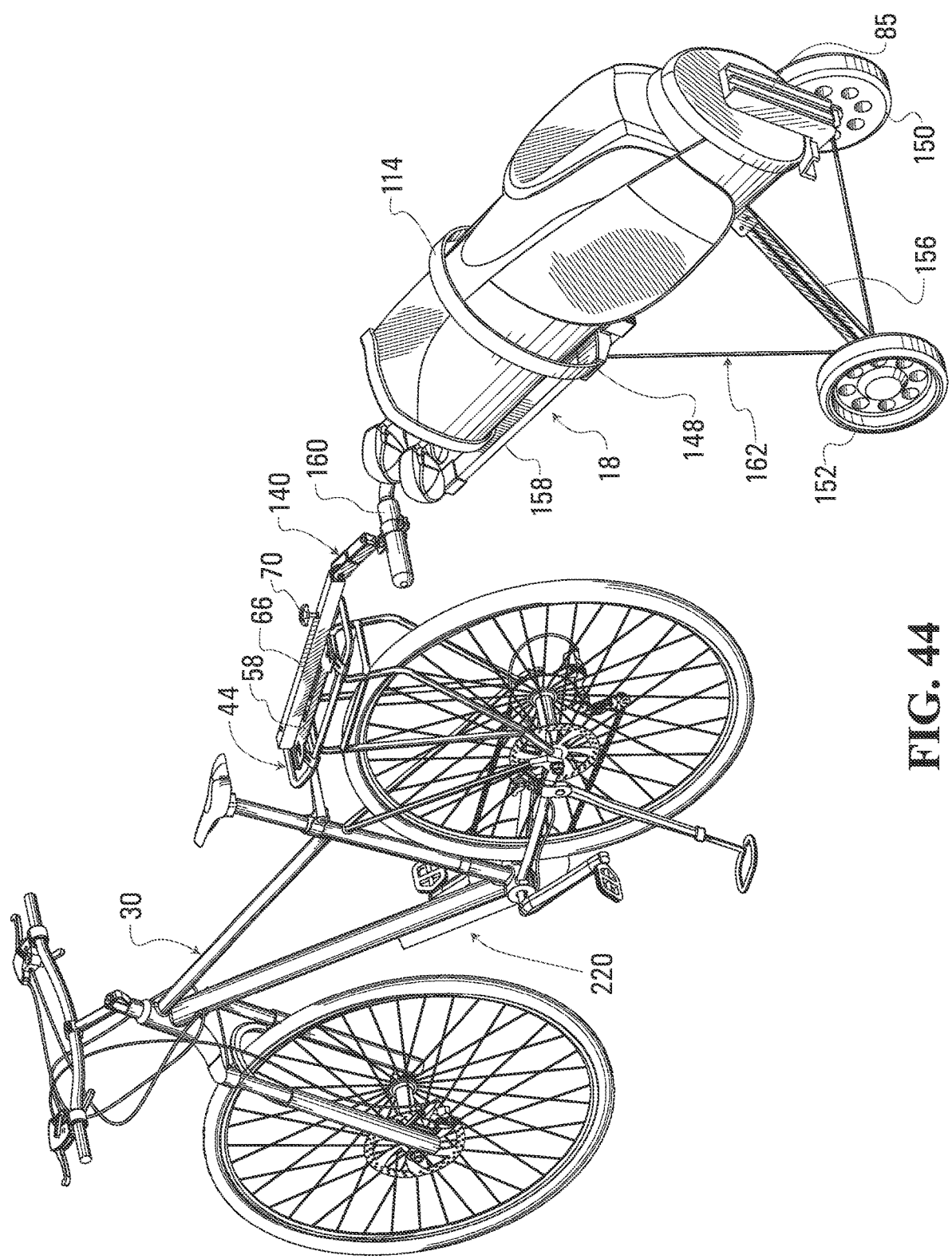
Figure 45:
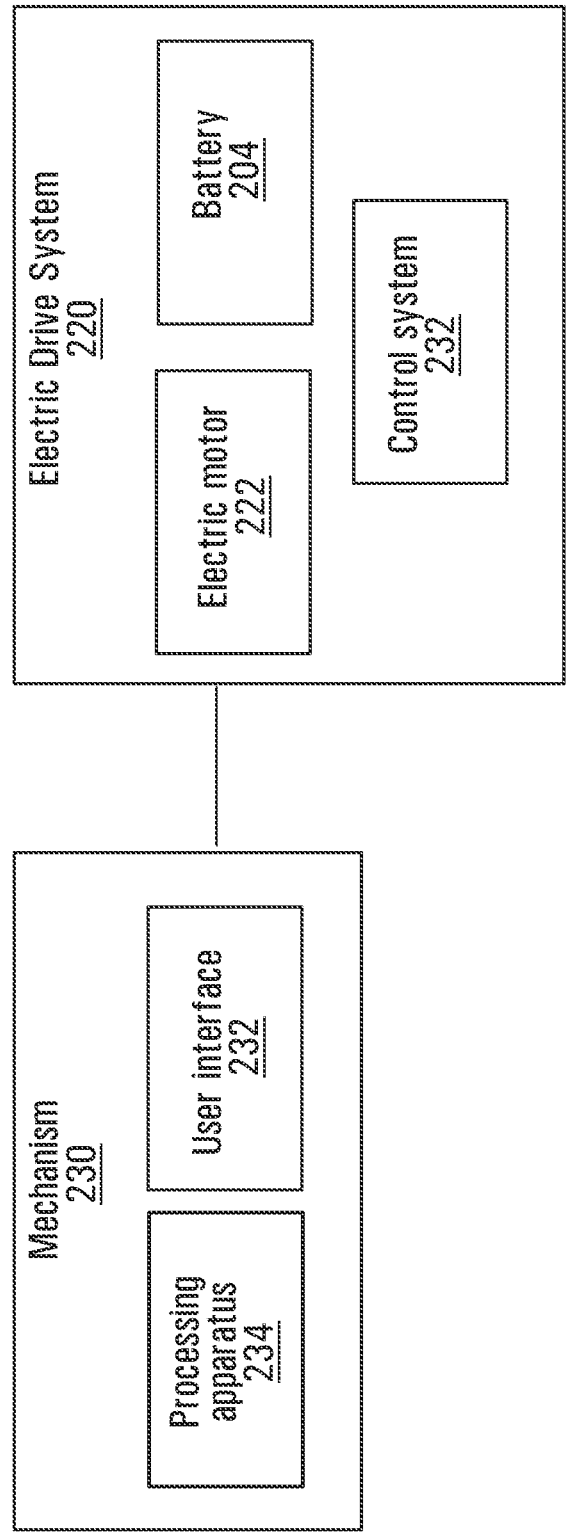
Figure 47:
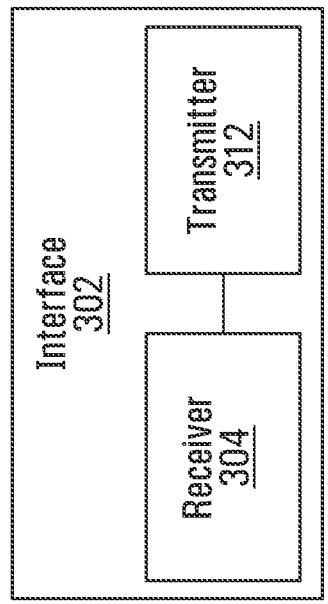
Figure 46:
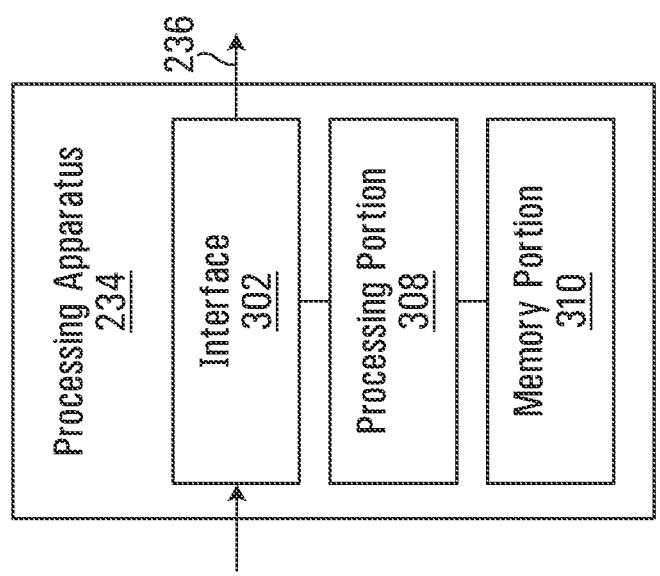

As another example, in some embodiments, as shown in FIGS. 43 and 44, the bicycle 30 may comprise an electric drive system 220, including an electric motor 222, a battery 224, and a control system 226, for providing powered assistance to the user as he/she rides the bicycle 30.

In some embodiments, the electric drive system 220 of the bicycle 30 may be configured to operate differently depending on whether the golf-bag carrier 12 is used to carry the golf bag 56. That is, the control system 226 may control the electric drive system 220, including the electric motor 222 and/or the battery 204, differently depending on whether the golf-bag carrier 12 is used to carry the golf bag 56. For instance, in some embodiments, the control system 226 may control the electric drive system 220 according to a given operational mode when the golf-bag carrier 12 is used to carry the golf bag 56, which may be referred to as a "carrying mode", and according to a different operational mode when the golf-bag carrier 12 is not used to carry the golf bag 56, which may be referred to as a "non-carrying mode".

Various parameters may be controlled differently by the control system 226 in the carrying mode and the non-carrying mode. For example, in some embodiments: power assistance generated by the electric drive system 220 may be different (e.g., greater) in the carrying mode than in the non-carrying mode; power management (e.g., of the battery 224) may be different (e.g., shorter and more intense energy use; greater use of regenerative breaking if available) in the carrying mode than in the non-carrying mode; etc.

As shown in FIGS. 45 to 49, the electric drive system 220 may comprise a golf-bag detection mechanism 230 to determine whether the golf-bag carrier 12 is used to carry the golf bag 56.

For instance, in some embodiments, the golf-bag detection mechanism 230 may be configured to determine whether the golf-bag carrier 12 is used to carry the golf bag 56 based on user input. The golf-bag detection mechanism 230 may comprise a user interface 232 including a set of controls that allow the user select whether the golf-bag carrier 12 is used to carry the golf bag 56. In some embodiments, the user interface 232 may be integrated to the bicycle 30 and may comprise an instrument panel (e.g., a dashboard) which provides indicators (e.g., a speedometer indicator, a battery level indicator, etc.) to convey information to the user. In some embodiments, the user interface 232 may be provided by a portable electronic device, such as a smartphone, a tablet, a computer, etc. (e.g., via a downloadable application, via a web browser, etc.).

The golf-bag detection mechanism 230 may comprise a processing apparatus 234 that is configured to generate a signal 236 based on whether the golf-bag carrier 12 is used to carry the golf bag 56, and the mechanism 230 may be configured to provide the signal 236 to the control system 226 of the electric drive system 220.

In this embodiment, the processing apparatus 234 may comprise an interface 302, a processing portion 308, and a memory portion 310, which are implemented by suitable hardware and/or software.

The interface 302 comprises one or more inputs and outputs allowing the processing apparatus 234 to receive input signals from and send output signals to other components to which the processing apparatus 234 is connected (i.e., directly or indirectly connected), including, in this embodiment, the user interface 232 and the electric drive system 220. For example, in this embodiment, an input of the interface 302 comprises a receiver 304 implemented to receive a signal from the set of controls of the user interface 232. An output of the interface 302 is implemented by a transmitter 312 to transmit the signal 236.

The processing portion 308 comprises one or more processors for performing processing operations that implement functionality of the processing apparatus 234. A processor of the processing portion 308 may be a general-purpose processor executing program code stored in the memory portion 310. Alternatively, a processor of the processing portion 308 may be a specific-purpose processor comprising one or more preprogrammed hardware or firmware elements (e.g., application-specific integrated circuits (ASICs), electrically erasable programmable read-only memories (EEPROMs), etc.) or other related elements.

The memory portion 310 comprises one or more memories for storing program code executed by the processing portion 308 and/or data used during operation of the processing portion 308. The memory portion 310 could also be used for storing data. A memory of the memory portion 310 may be a semiconductor medium (including, e.g., a solid-state memory), a magnetic storage medium, an optical storage medium, and/or any other suitable type of memory. A memory of the memory portion 310 may be read-only memory (ROM) and/or random-access memory (RAM), for example.

In some embodiments, two or more elements of the processing apparatus 234 may be implemented by devices that are physically distinct from one another and may be connected to one another via a bus (e.g., one or more electrical conductors or any other suitable bus) or via a communication link which may be wired, wireless, or both. In other embodiments, two or more elements of the processing apparatus 234 may be implemented by a single integrated device. In some embodiments, the processing apparatus 234 is integrated into the bicycle 30 itself during original manufacturing of the bicycle 30. In some embodiments, at least part of the processing apparatus 234 in integrated into a remote device such as a smartphone or a remote computer.

Figure 49:
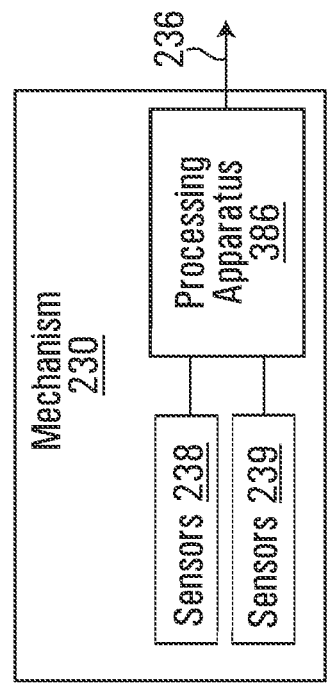
Figure 48:
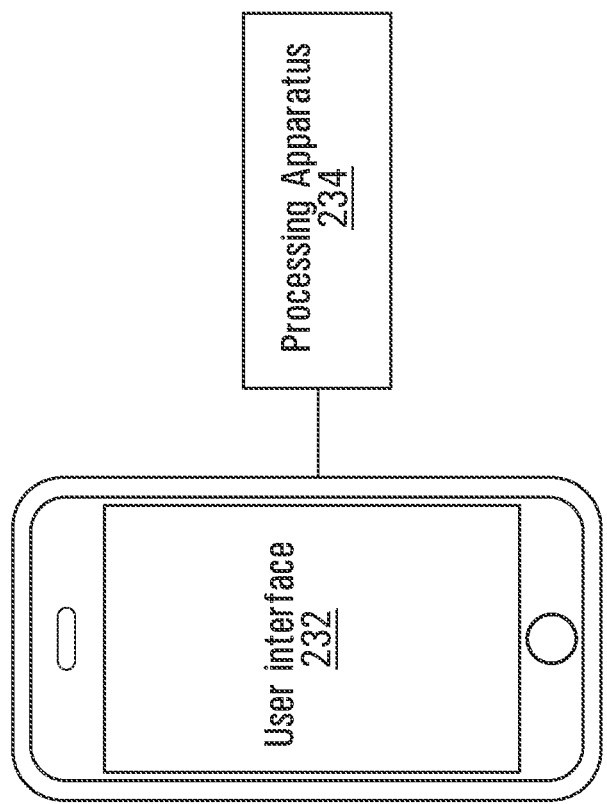
Figure 51:
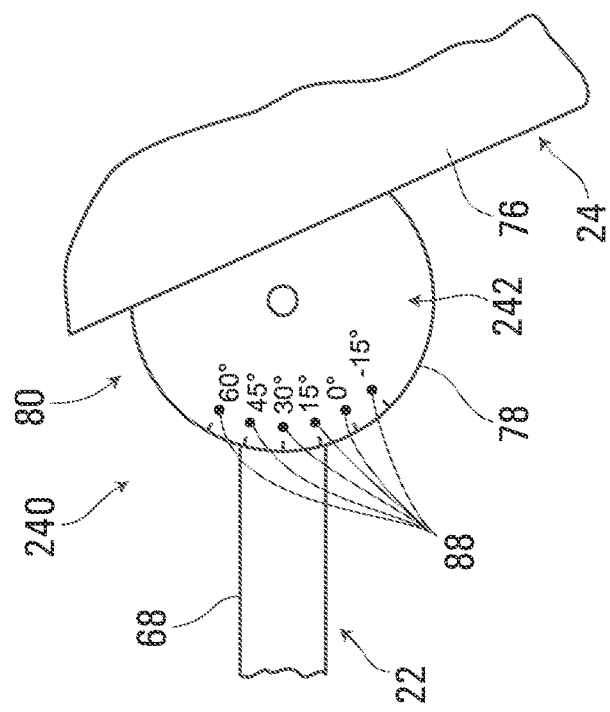
FIGS. 50 to 53 show variants of the system wherein the golf-bag carrier comprises an adjustment indicator.
Figure 52:
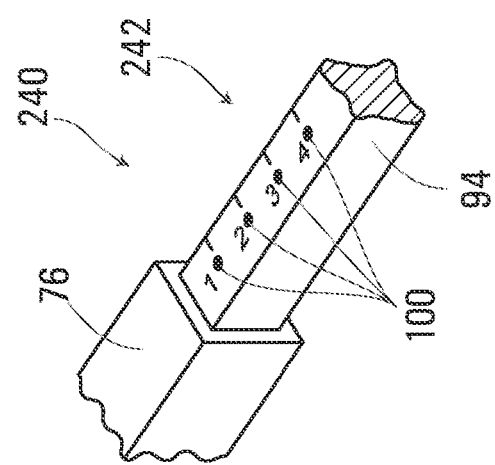
Figure 50:
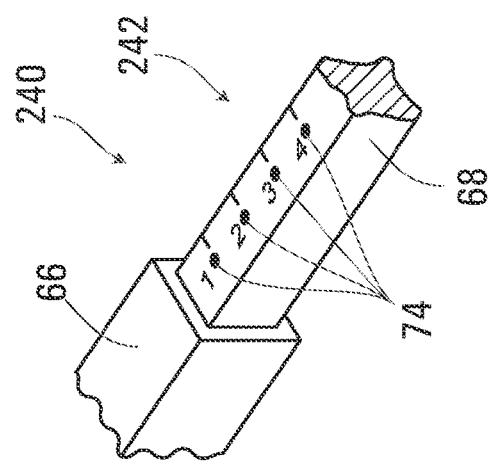
Figure 53:
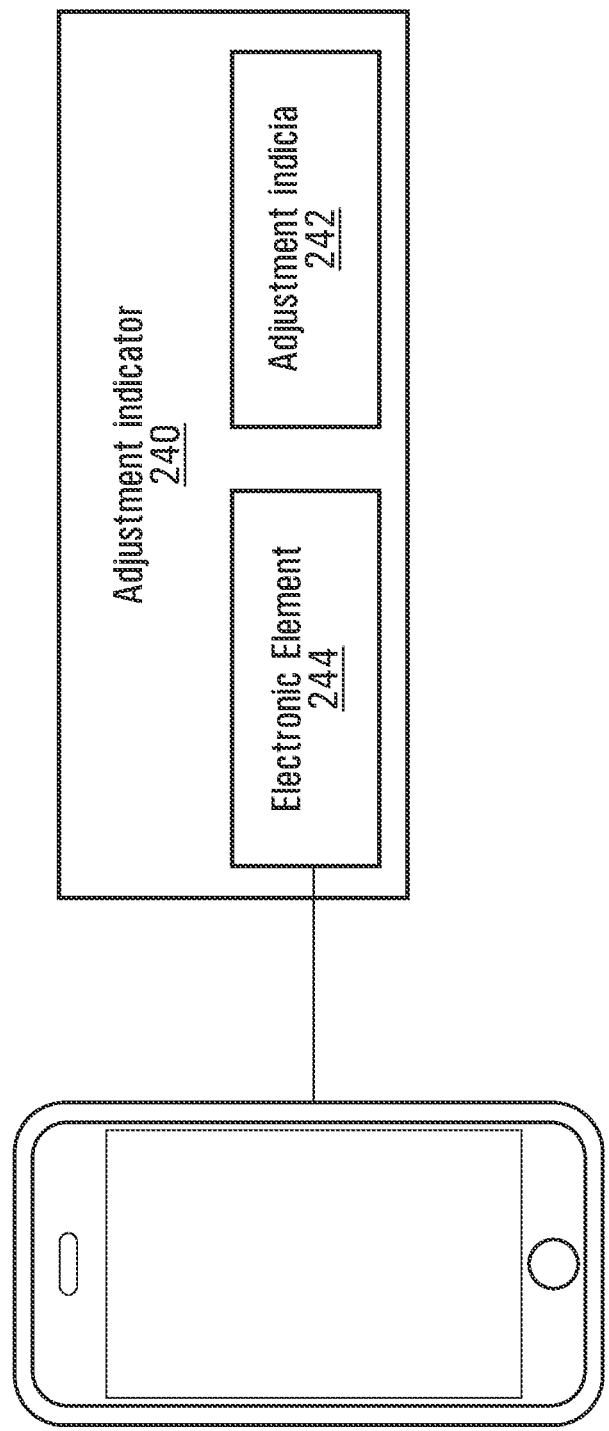

In some embodiments, as shown in FIG. 49, the mechanism 230 may be configured to determine whether the golf-bag carrier 12 is used to carry the golf bag 56 in an automatic fashion, i.e., without user input.

For instance, in some embodiments, the golf-bag detection mechanism 230 may be configured to determine whether the golf-bag carrier 12 is used and to control a power output of the electric drive system 220 depending on whether the golf-bag carrier 12 is used. For example, the golf-bag detection mechanism 230 may comprise a load sensor 238 to determine whether the golf-bag carrier 12 is used. In this embodiment, the input of the interface 302 is implemented to receive a signal from the sensor 238, the memory portion 310 may be used to store data related to a relationship between a signal of the sensor 238 and the presence or absence of the golf-bag carrier 12, and the processing portion 308 may be configured to command the signal 236 depending on the sensor signal and the data stored in the memory portion 310.

In some embodiments, the golf-bag detection mechanism 230 may be configured to determine the required electric-drive-system-220 power output to drive the bicycle 30 and to control the power output of the electric drive system 220 power output depending on the required electric-drive-system-220 power output. For example, the golf-bag detection mechanism 230 may comprise one or more sensors 239 to determine a slope of the ground surface, a speed of the bicycle 30, a work force output of the electric drive system 220 and/or a power output of the electric drive system 220. For instance, the sensors 239 may comprise an accelerometer, a speed sensor, an inclinometer, a stress sensor, a strain sensor and/or a power sensor. In this embodiment, the input of the interface 302 is implemented to receive a signal from the sensors 239, the memory portion 310 may be used to store data related to a relationship between a signal of the sensors 239 and a required electric-drive-system-220 power output level, a required electric-drive-system-220 power output increase and/or a required electric-drive-system-220 power output decrease, and the processing portion 308 may be configured to command the signal 236 depending on the sensor signal and the data stored in the memory portion 310.

As another example, in some embodiments, as shown in FIGS. 50 to 53, the golf-bag carrier 12 may comprise an adjustment indicator 240 configured to convey adjustment parameters (e.g., settings) of the golf-bag carrier 12 that define the position of the golf bag 56 relative to the bicycle 30 which is desired by the user (e.g., the linear position of the golf bag 56 relative to the bicycle 30 in the longitudinal direction of the bicycle 30 and/or the angular position of the golf bag 56 relative to the bicycle 30 desired by the user). This may be useful in situations where the user brings his/her golf bag 56 but obtains (e.g., rents) the bicycle 30 with the golf-bag carrier 12 at the golf course to facilitate rapid set up and adjustment of his/her golf bag 56 on the golf-bag carrier 12 when arriving at the golf course, and/or in various other situations (e.g., in which the user wants to readily set up and adjust his/her golf bag 56 onto his/her bicycle 30 with his/her golf-bag carrier 12 at a beginning of every golfing season).

For instance, in some embodiments, the adjustment indicator 240 of the golf-bag carrier 12 may comprise adjustment indicia 242 on the golf-bag carrier 12. For instance, the adjustment indicia 242 may be provided on the pivot plates 78, 80, and may indicate an angle of the post 76 relative to the carrier plate 58 and the arm tubes 66, 68 of the carrier 12. The adjustment indicia 242 may be provided in any suitable increments such as increments of 1°, 5°, 10°, 15°, etc., and/or may indicate the degree of inclination beside each of the holes 88.

Adjustment indicia 242 may also be provided to indicate a longitudinal adjustment indicia of a length L of the carrier 12 and/or of the length $L_H$ of the post 76. For example, adjustment indicia 242 may be provided between the base 14 and the holder 16, in any suitable increments such as increments of 1 cm, 5 cm, 10 cm, etc., and/or may indicate a corresponding length L beside each of the holes 74. Adjustment indicia 242 may also be provided between the tubes 92, 94, in any suitable increments such as increments of 1 cm, 5 cm, 10 cm, etc., and/or may indicate a corresponding length beside each of the holes 100.

In some examples of implementation, the adjustment indicator 240 may comprise an electronic element 244 (e.g., a radio-frequency identification (RFD) tag) configured to receive, store and wirelessly convey the adjustment parameters, which may have been read or otherwise observed from the adjustment indicia 242 on the golf-bag carrier 12. A smartphone, RFID reader, or other portable communication device can be used to input and retrieve the adjustment parameters into and from the electronic element 244.

In some embodiments where the user brings his/her golf bag 56 but obtains (e.g., rents) the bicycle 30 with the golf-bag carrier 12 at the golf course when arriving at the golf course, the adjustment parameters of the golf-bag carrier 12 for the user may have been communicated to and recorded in a database associated with the golf course (e.g., in computer-readable media or on paper or some other tangible media storing the database for various golfers) and used by an employee or other individual associated with the golf course who can proceed to adjust the golf-bag carrier 12 on the bicycle 12 for the golf bag 56 of the user when he/she arrives at the golf course.

While in embodiments considered above the vehicle 30 is a bicycle, in other embodiments, the vehicle 30 may be another type of vehicle such as a scooter, a cart, etc. Notably, in other embodiments, the vehicle 30 may be another type of two-wheel vehicle. In some embodiments, the vehicle 30 may have more than two wheels.

Figure 54:
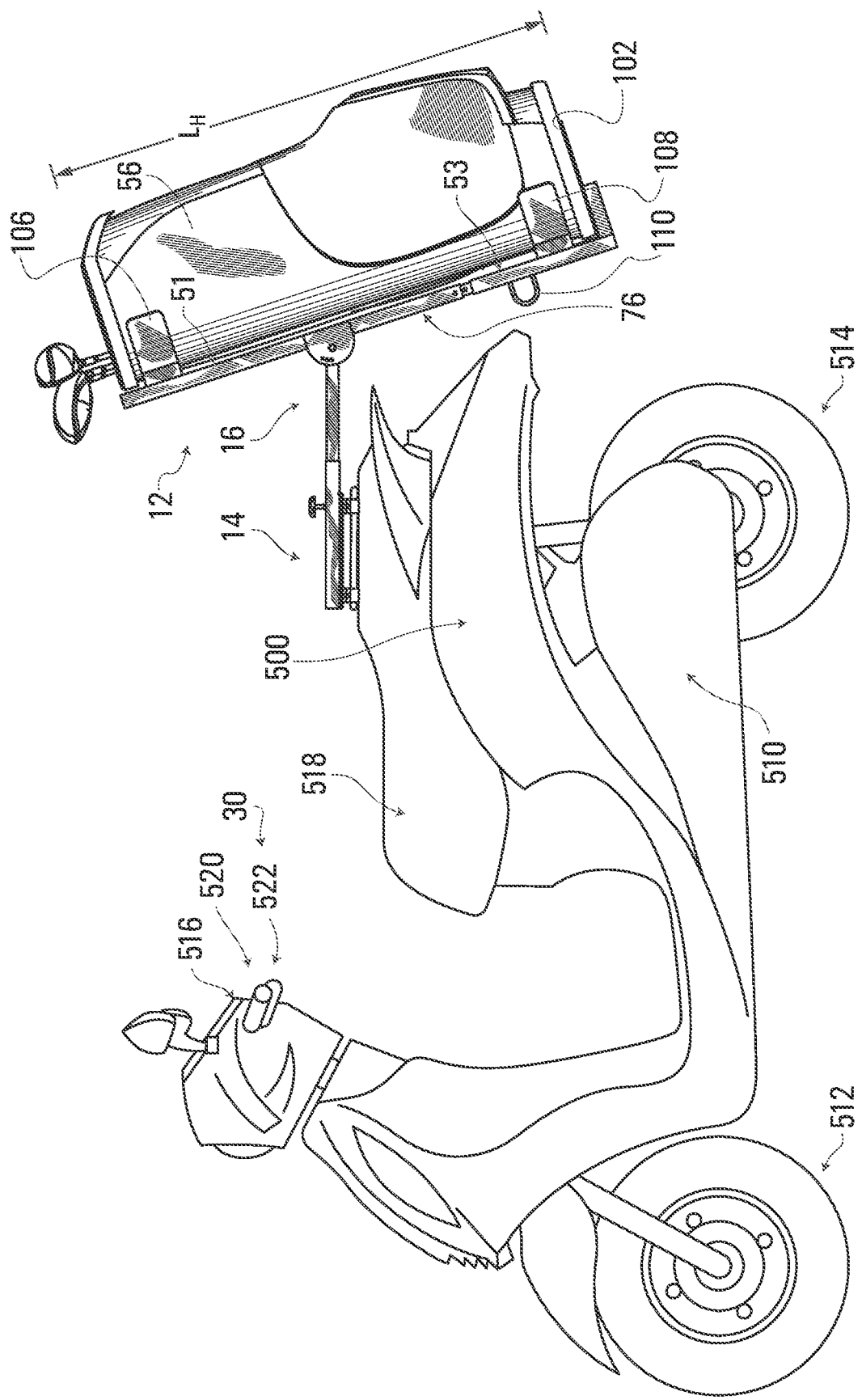
FIGS. 54 to 56 show variants of the system wherein the vehicle is a scooter.
Figure 55:
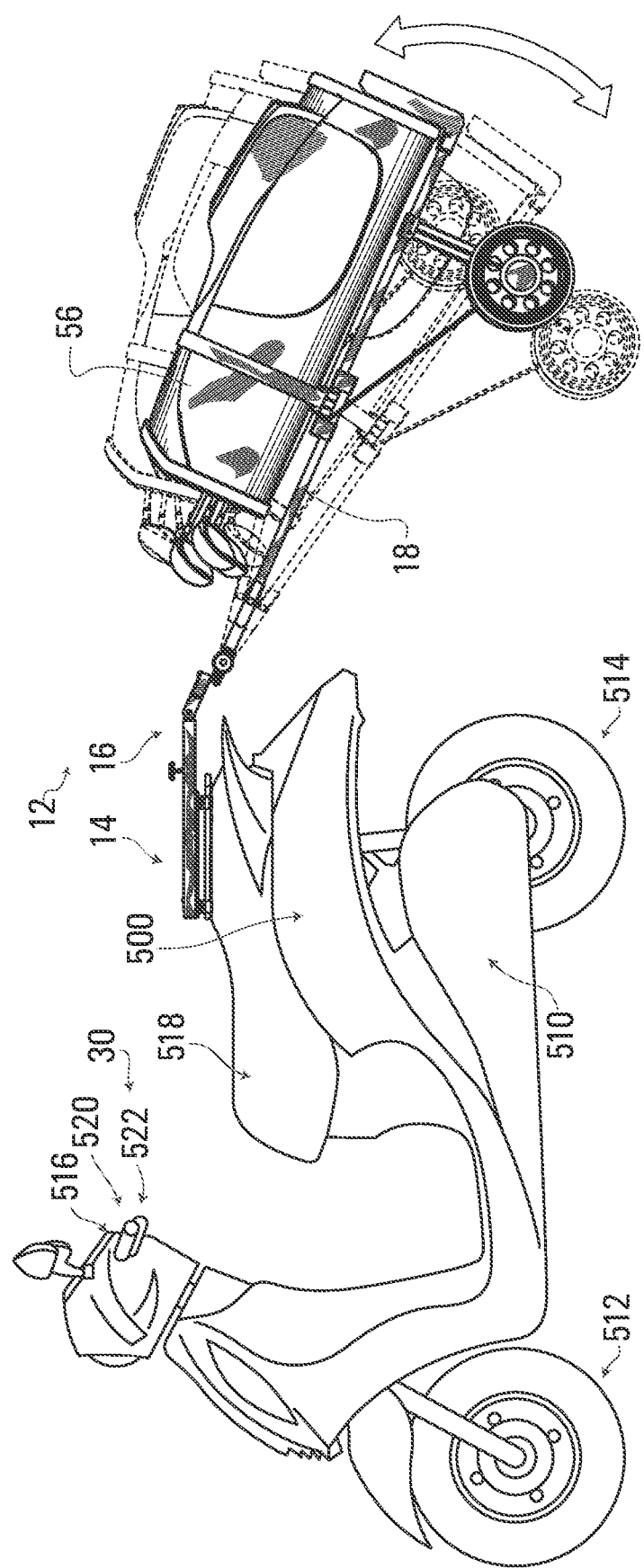

For instance, in some embodiments, as shown in FIGS. 54 and 55, the vehicle 30 is a scooter, e.g., a two-wheel scooter, a three-wheel scooter, a four-wheel scooter, etc. In this embodiment, the scooter 30 comprises a frame 500, a prime mover 510, at least one (e.g., one, two) front wheel 512, at least one (e.g., one, two) rear wheel 514, a steering mechanism 516, a seat 518 and a user interface 520 that enable the user to move the scooter 30 on the ground. In this embodiment, the golf-bag carrier 12 is installed on the frame 500 of the scooter 30 and/or on a rack that is affixed to the frame 500.

In some embodiments, the user interface 520 of the scooter 30 may comprise the golf-bag detection mechanism 230. That is, the user interface 520 of the scooter 30 may comprise the user interface 232 and the processing apparatus 234 (including the interface 302, processing portion 308 and memory portion 310) of the golf-bag detection mechanism 230, and the mechanism 230 may be configured to provide a signal to control a power output of the prime mover 510 of the scooter 30 depending on whether the scooter 30 carries a golf bag, on how many golf bags are carried by the scooter 30, on a slope of the ground surface, etc.

For example, the user interface 520 may comprise a button or a switch 522 that may be operated by a driver of the scooter 30 to indicate whether the scooter 30 carries a golf bag and how many golf bags are carried by the scooter 30.

Figure 56:
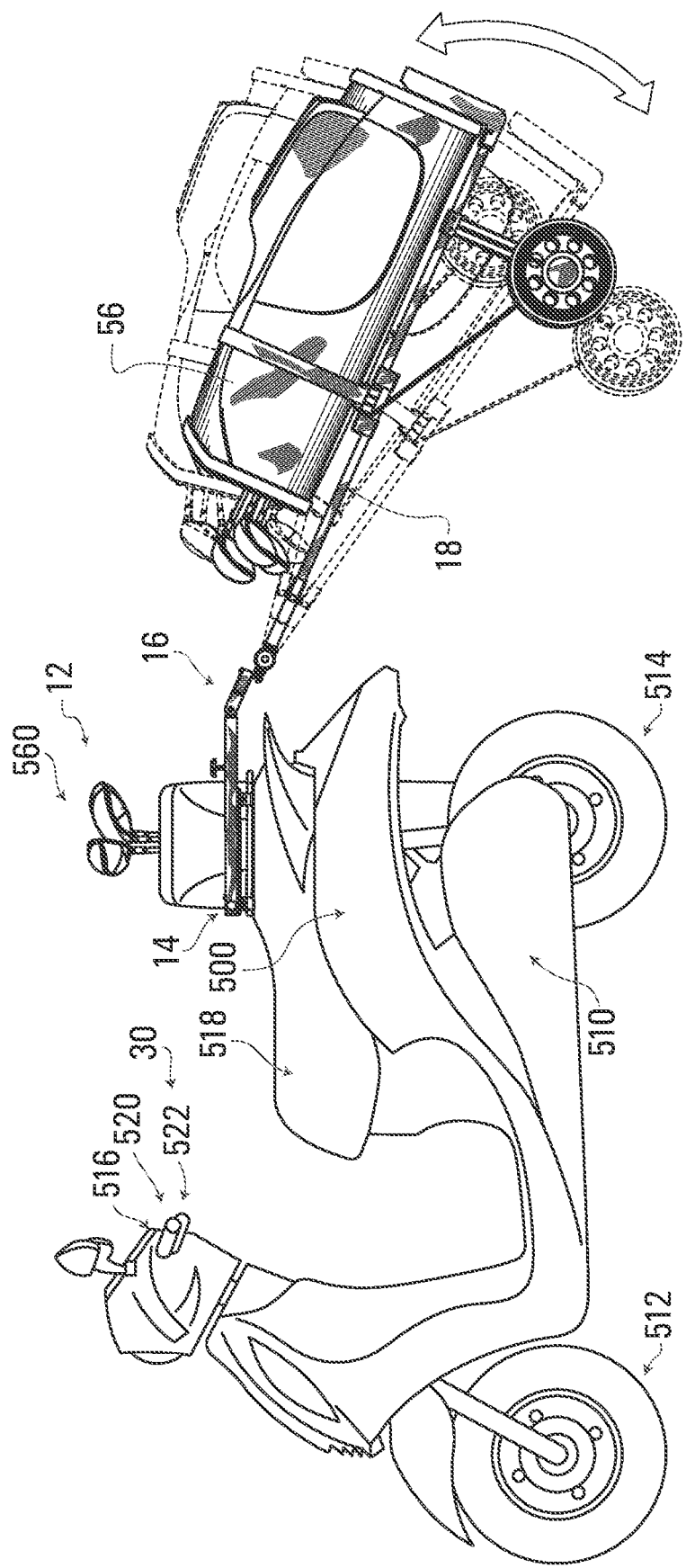

In some embodiments, as shown in FIG. 56, the scooter 30 may be provided with a support to carry a golf bag 560 and the golf-bag carrier 12 may be installed on the scooter 30 to allow the scooter to carry a second golf bag, e.g., the golf bag 56.

In some examples of implementation, any feature of any embodiment described herein may be used in combination with any feature of any other embodiment described herein.

Certain additional elements that may be needed for operation of some embodiments have not been described or illustrated as they are assumed to be within the purview of those of ordinary skill in the art. Moreover, certain embodiments may be free of, may lack and/or may function without any element that is not specifically disclosed herein.

In case of any discrepancy, inconsistency, or other difference between terms used herein and terms used in any document incorporated by reference herein, meanings of the terms used herein are to prevail and be used.

Although various embodiments and examples have been presented, this was for purposes of description, but should not be limiting. Various modifications and enhancements will become apparent to those of ordinary skill in the art.

The invention claimed is:

1. A golf-bag carrier for a bicycle to carry a golf bag, the bicycle comprising a front wheel, a rear wheel, a frame, and a seat, the front wheel and the rear wheel being configured to roll on a ground surface, the golf-bag carrier comprising:
a base configured to be connected to the bicycle; and
a holder connected to the base and configured to hold the golf bag such that the golf bag is supported on the ground surface only by the front wheel and the rear wheel while the bicycle travels on the ground surface;
wherein: the holder is adjustable relative to the base for adjusting a linear position of the golf bag relative to the bicycle in a longitudinal direction of the bicycle and for adjusting an inclination of the golf bag relative to the bicycle; the golf-bag carrier comprises an adjustment system that comprises a first adjustment mechanism configured to adjust a linear position of at least part of the holder relative to the bicycle in the longitudinal direction of the bicycle, and a second adjustment mechanism configured to adjust an inclination of at least part of the holder relative to the bicycle.

2. The golf-bag carrier of claim 1, wherein: the bicycle comprises a rack connected to the frame above the rear wheel; and the base is configured to be fastened to the rack.

3. The golf-bag carrier of claim 2, wherein: the rack comprises a horizontal portion extending horizontally above the rear wheel; and the base is configured to be fastened to the horizontal portion of the rack.

4. The golf-bag carrier of claim 3, wherein the base comprises a plurality of connectors spaced apart from one another and configured to fasten the base to the horizontal portion of the rack.

5. The golf-bag carrier of claim 4, wherein the connectors of the base are configured to engage opposite lateral sides of the rack to fasten the base to the horizontal portion of the rack.

6. The golf-bag carrier of claim 4, wherein the connectors of the base comprise clips.

7. The golf-bag carrier of claim 6, wherein each clip has a thickness of at least 3 mm and a width of at least 30 mm.

8. The golf-bag carrier of claim 6, wherein the connectors of the base comprise fasteners extending through the clips.

9. The golf-bag carrier of claim 2, wherein: the base comprises a fixed member configured to be fixed relative to the rack; the holder comprises a movable member adjustable relative to the fixed member of the base; and the golf-bag carrier comprises an adjustment mechanism configured to adjust the movable member of the holder relative to the fixed member of the base.

10. The golf-bag carrier of claim 9, wherein the movable member of the holder is telescopically adjustable relative to the fixed member of the base.

11. The golf-bag carrier of claim 9, wherein: the golf-bag carrier comprises an arm; the fixed member of the base is a first portion of the arm; and the movable member of the holder is a second portion of the arm that is movable relative to the first portion of the arm along a longitudinal axis of the arm.

12. The golf-bag carrier of claim 11, wherein the second portion of the arm is telescopically movable relative to the first portion of the arm.

13. The golf-bag carrier of claim 1, wherein at least part of the holder is translatable relative to the base to adjust a position of the holder relative to the base.

14. The golf-bag carrier of claim 1, wherein at least part of the holder is pivotable relative to the base to adjust an inclination of the holder relative to the base.

15. The golf-bag carrier of claim 1, wherein at least part of the holder is translatable relative to the base and at least part of the holder is pivotable relative to the base to adjust a position and an inclination of the holder relative to the base.

16. The golf-bag carrier of claim 1, wherein the holder comprises a pivot configured to selectively allow and prevent pivoting of at least part of the holder relative to the base to adjust the inclination of the golf bag relative to the bicycle.

17. The golf-bag carrier of claim 1, wherein the holder comprises a first portion and a second portion movable relative to the first portion of the holder to adjust a length of the holder.

18. The golf-bag carrier of claim 17, wherein the second portion of the holder is telescopically movable relative to the first portion of the holder to adjust the length of the holder.

19. The golf-bag carrier of claim 1, wherein the holder comprises a post and a plurality of holding members spaced from one another along the post.

20. The golf-bag carrier of claim 19, wherein the post comprises a first portion and a second portion movable relative to the first portion of the post to adjust a length of the post.

21. The golf-bag carrier of claim 20, wherein the second portion of the post is telescopically movable relative to the first portion of the post to adjust the length of the post.

22. The golf-bag carrier of claim 19, wherein: a first one of the holding members comprises a brace disposed in an upper half of the holder; and a second one of the holding members comprises a support disposed in a lower half of the holder and configured to engage a bottom of the golf bag.

23. The golf-bag carrier of claim 1, wherein: the frame of the bicycle comprises a stay; and the base comprises a support structure extending downwardly towards and configured to be fastened to the stay.

24. The golf-bag carrier of claim 1, wherein the support structure of the base comprises a first support member configured to be connected to the stay on a first side of the rear wheel and a second support member configured to be connected to the stay on a second side of the rear wheel opposite to the first side of the rear wheel.

25. The golf-bag carrier of claim 1, wherein: part of the first adjustment mechanism is provided on the base; part of the first adjustment mechanism is provided on the holder; and the adjustment mechanism is provided on the holder.

26. The golf-bag carrier of claim 1, wherein the bicycle comprises an electric drive system that is configured to provide powered assistance to the user as the user rides the bicycle, the electric drive system comprising an electric motor, a battery, and a control system that is configured to operate the electric drive system.

27. The golf-bag carrier of claim 26, wherein the control system is configured to operate the electric drive system differently depending on whether the bicycle is carrying a golf bag.

28. A golf-bag carrier for a bicycle to carry a golf bag, the bicycle comprising a front wheel, a rear wheel, a frame, and a seat, the front wheel and the rear wheel being configured to roll on a ground surface, the golf-bag carrier comprising:
 a base configured to be connected to the bicycle; and
 a holder connected to the base and configured to hold the golf bag such that the golf bag is supported on the ground surface only by the front wheel and the rear wheel while the bicycle travels on the ground surface;
wherein: the holder is adjustable relative to the base for adjusting a linear position of the golf bag relative to the bicycle in a longitudinal direction of the bicycle and for adjusting an inclination of the golf bag relative to the bicycle, the holder being adjustable relative to the base to move a center of mass of a combination of the golf-bag carrier and the golf bag towards a user riding the bicycle in the longitudinal direction of the bicycle.

29. The golf-bag carrier of claim 28, wherein the holder is adjustable relative to the base such that a center of mass of a combination of the golf-bag carrier and the golf bag is located frontward of an axis of rotation of the rear wheel.

30. The golf-bag carrier of claim 28, wherein the holder is adjustable relative to the base such that a center of mass of a combination of the golf-bag carrier and the golf bag is located within a span of the rear wheel in a longitudinal direction of the bicycle.

* * * * *